United States Patent
Yang et al.

(10) Patent No.: US 11,757,564 B2
(45) Date of Patent: Sep. 12, 2023

(54) LINK ADAPTATION USING TRANSMISSION RATE OPTIONS

(71) Applicant: QUALCOMM Incorporated, San Diego, CA (US)

(72) Inventors: Lin Yang, San Diego, CA (US); Bin Tian, San Diego, CA (US); Dung Ngoc Doan, San Diego, CA (US); Sameer Vermani, San Diego, CA (US); Stephen Jay Shellhammer, Ramona, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/103,550

(22) Filed: Nov. 24, 2020

(65) Prior Publication Data
US 2021/0167889 A1    Jun. 3, 2021

Related U.S. Application Data

(60) Provisional application No. 62/942,703, filed on Dec. 2, 2019.

(51) Int. Cl.
*H04W 24/08* (2009.01)
*H04L 1/00* (2006.01)
*H04W 84/12* (2009.01)

(52) U.S. Cl.
CPC .......... *H04L 1/0013* (2013.01); *H04L 1/0003* (2013.01); *H04W 24/08* (2013.01); *H04W 84/12* (2013.01)

(58) Field of Classification Search
None
See application file for complete search history.

(56) References Cited

U.S. PATENT DOCUMENTS

2005/0089005 A1* 4/2005 Sakoda ............. H04W 74/0816
                                                                370/348
2006/0105724 A1* 5/2006 Nakao ................... H04L 1/0002
                                                                455/115.1
(Continued)

FOREIGN PATENT DOCUMENTS

| EP | 3528408 |        | 8/2019 |              |
|----|---------|--------|--------|--------------|
| EP | 3528408 | A1 *   | 8/2019 | ... H04L 1/0002 |
| WO | 2021113141 |     | 6/2021 |              |

OTHER PUBLICATIONS

"PCT Application No. PCT/US2020/062209 International Search Report and Written Opinion", dated Mar. 9, 2021, 11 pages.
(Continued)

*Primary Examiner* — The Hy Nguyen
(74) *Attorney, Agent, or Firm* — Holland & Hart / Qualcomm

(57) ABSTRACT

This disclosure provides systems, methods, and apparatus, including computer programs encoded on computer-readable media, for link adaptation in a wireless local area network (WLAN). A link adaptation test packet from a first WLAN device to a second WLAN may include a plurality of link adaptation test portions that are generated using a corresponding plurality of transmission rate options. For example, the plurality of link adaptation test portions may be modulated using different modulation and coding scheme (MCS) options. Thus, a single test packet may be used to evaluate different transmission rate options. The second WLAN device may provide feedback information regarding the link adaptation test portions. The feedback information may be used to determine a transmission rate for a subsequent transmission from the first WLAN device to the second WLAN device based on wireless channel conditions.

29 Claims, 13 Drawing Sheets

(56) References Cited

U.S. PATENT DOCUMENTS

| | | | |
|---|---|---|---|
| 2007/0030917 A1* | 2/2007 | Farag | H04L 1/1819 375/265 |
| 2008/0002659 A1 | 1/2008 | Fontaine et al. | |
| 2010/0014500 A1* | 1/2010 | Lee | H04L 12/18 370/342 |
| 2012/0263141 A1* | 10/2012 | Taghavi Nasrabadi | H04L 1/001 370/330 |
| 2012/0269183 A1* | 10/2012 | Sohn | H04L 1/0026 370/338 |
| 2013/0010632 A1* | 1/2013 | Wang | H04B 17/309 370/252 |
| 2016/0057647 A1* | 2/2016 | Sullivan | H04L 1/0016 370/253 |
| 2016/0127108 A1* | 5/2016 | Jindal | H04W 72/0453 370/281 |
| 2016/0212749 A1* | 7/2016 | Abraham | H04W 28/22 |
| 2016/0227599 A1* | 8/2016 | Lee | H04L 1/0028 |
| 2016/0242233 A1* | 8/2016 | Kang | H04L 1/0003 |
| 2018/0192425 A1* | 7/2018 | Yeh | H04W 72/042 |
| 2018/0279315 A1* | 9/2018 | Salem | H04L 1/0072 |

OTHER PUBLICATIONS

Kim, et al., "Probing-Based Link Adaptation for High Data Rate Wireless LANs", IEEE Transactions on Wireless Communications, IEEE Service Center, Jul. 2012, p. 2385-p. 2388, Section II-A; p. 2383-p. 2384, figures 2-4.

Zhao, et al., "RainbowRate: MIMO Rate Adaptation in 802.11n WiLD Links", 2014 IEEE 33rd International Performance Computing and Communications Conference (IPCCC), IEEE, Dec. 5, 2014, 8 pages.

* cited by examiner

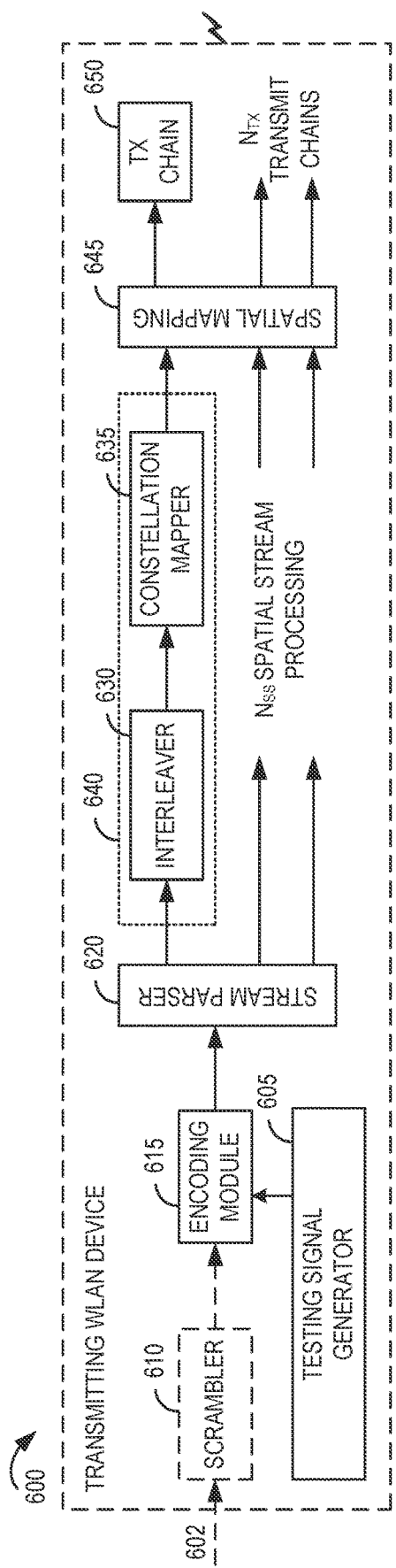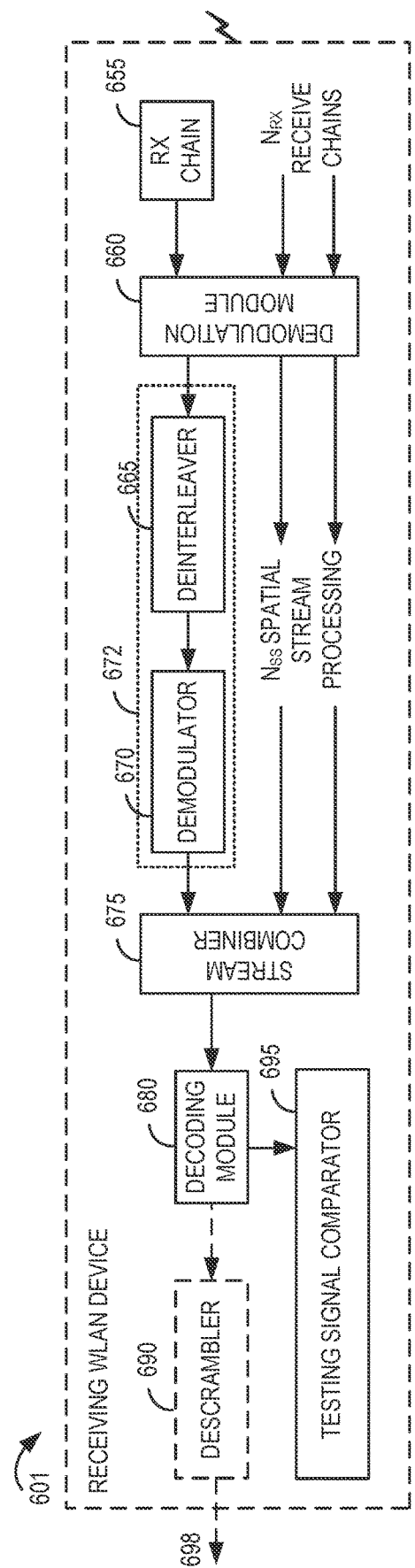

LINK ADAPTATION USING TRANSMISSION RATE OPTIONS

CROSS-REFERENCE TO RELATED APPLICATIONS

This Patent Application claims priority to U.S. Provisional Patent Application No. 62/942,703, filed Dec. 2, 2019, entitled "LINK ADAPTATION WITH MODULATION AND CODING SCHEME (MCS) SELECTION," and assigned to the assignee hereof. The disclosure of the prior Application is considered part of and is incorporated by reference in this Patent Application.

TECHNICAL FIELD

This disclosure relates to the field of wireless communication, and more particularly to link adaptation in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP and including one or more wirelessly connected STAs associated with the AP. A station (STA) may have a wireless connection (referred to as a wireless association, or just "association") when it has authenticated and established a wireless session with the AP.

Two or more WLAN devices (such as an AP and a STA) may establish a communication link to communicate with each other via the shared wireless communication medium. Depending on the conditions on the communication link, the WLAN devices may adjust transmission parameters to optimize throughput or reliability of transmissions on the communication link. For example, the transmission parameters may be adjusted to account for radio conditions, environmental impediments, pathloss, interference due to signals of other transmitters, sensitivity of the receiver, or transmitter power, among other examples.

SUMMARY

The systems, methods, and devices of this disclosure each have several innovative aspects, no single one of which is solely responsible for the desirable attributes disclosed herein. The innovative aspects may include any combination of the following implementation options.

One innovative aspect of the subject matter described in this disclosure can be implemented as a method performed by a first wireless local area network (WLAN) device. The method may include transmitting a first packet from a first WLAN device to a second WLAN device via a wireless channel. The first packet may include a plurality of link adaptation test portions generated using a corresponding plurality of transmission rate options. The method may include receiving, from the second WLAN device, feedback information based on the plurality of link adaptation test portions in the first packet. The method may include determining a selected transmission rate option for transmission of a subsequent packet to the second WLAN device via the wireless channel based on the feedback information.

In some implementations, the plurality of transmission rate options includes different modulation and coding scheme (MCS) options. In some implementations, the plurality of link adaptation test portions includes a first portion modulated using a first MCS and a second portion modulated using a second MCS option.

In some implementations, the first packet has a format based on a null data packet (NDP) defined for the WLAN.

In some implementations, the first packet includes an indication to cause the second WLAN device receive to the plurality of link adaptation test portions using the corresponding plurality of transmission rate options and provide the feedback information based on the plurality of link adaptation test portions.

In some implementations, the first packet is a dedicated link adaptation test packet having a format specified by a link adaptation protocol.

In some implementations, the first packet includes upper layer data for the second WLAN device in addition to the plurality of link adaptation test portions.

In some implementations, the upper layer data is included in a separate portion of the first packet that is different from the plurality of link adaptation test portions.

In some implementations, the plurality of link adaptation test portions includes a first portion that is modulated in a first set of tones of an orthogonal frequency division multiplexed (OFDM) symbol and a second portion that is modulated in second set of tones of the same OFDM symbol.

In some implementations, the plurality of link adaptation test portions includes a first portion and a second portion of the first packet are modulated in different orthogonal frequency division multiplexed (OFDM) symbols associated with transmission of the first packet.

In some implementations, the first packet includes a series of OFDM symbols, each OFDM symbol being modulated using a different transmission rate option.

In some implementations, the feedback information includes a field that indicates the selected transmission rate option that was selected by the second WLAN device.

In some implementations, the feedback information includes one or more link quality metrics related to the plurality of link adaptation test portions. The method may include determining, by the first WLAN device, the selected transmission rate option based on the one or more link quality metrics.

In some implementations, the one or more link quality metrics may include a log-likelihood ratio (LLR), a signal to noise ratio (SNR), a signal to interference plus noise ratio (SINR), an error vector magnitude (EVM), or any combination thereof.

In some implementations, receiving the feedback information includes receiving an acknowledgement (ACK) message in response to the first packet. The ACK message may include a field populated with the feedback information.

In some implementations, the first packet is a request to send (RTS) packet. In some implementations, receiving the feedback information includes receiving a clear to send (CTS) message in response to the RTS. The CTS message may include a field populated with the feedback information.

In some implementations, each of the plurality of link adaptation test portions is modulated using a different modulation and coding scheme (MCS) option. The feedback information may include an LLR metric indicative of a decoding success rate for each of the plurality of link adaptation test portions. In some implementations, determining the selected transmission rate option may include selecting an MCS option associated with a link adaptation test portion having a highest throughput and for which the corresponding LLR metric is above a threshold.

Another innovative aspect of the subject matter described in this disclosure can be implemented as a method performed by a second WLAN device. The method may include receiving, from a first WLAN device via a wireless channel, a first packet that includes a plurality of link adaptation test portions generated using a corresponding plurality of transmission rate options. The method may include transmitting feedback information to the first WLAN device based on the plurality of link adaptation test portions in the first packet. The feedback information may be usable by the first WLAN device to determine a selected transmission rate option for transmission of a subsequent packet from the first WLAN device via the wireless channel.

In some implementations, the plurality of transmission rate options includes different MCS options. The plurality of link adaptation test portions may include a first portion modulated using a first MCS and a second portion modulated using a second MCS option.

In some implementations, the method may include determining one or more first link quality metrics based on the first portion of the first packet. The method may include determining one or more second link quality metrics based on the second portion of the first packet.

In some implementations, the method may include determining the feedback information includes the one or more first link quality metrics and the one or more second link quality metrics.

In some implementations, the method may include determining the selected transmission rate option based on the plurality of link adaptation test portions in the first packet. The feedback information may include a field that indicates the selected transmission rate option.

Another innovative aspect of the subject matter described in this disclosure can be implemented as an apparatus of a first WLAN device. The apparatus may include at least one modem configured to output a first packet for transmission from the first WLAN device to a second WLAN device via a wireless channel. The first packet may include a plurality of link adaptation test portions generated using a corresponding plurality of transmission rate options. The at least one modem may be configured to obtain, from the second WLAN device, feedback information based on the plurality of link adaptation test portions in the first packet. The apparatus may include at least one processor communicatively coupled with the at least one modem and configured to determine a selected transmission rate option for transmission of a subsequent packet to the second WLAN device via the wireless channel based on the feedback information.

In some implementations, the plurality of transmission rate options includes different MCS options. In some implementations, the plurality of link adaptation test portions includes a first portion modulated using a first MCS and a second portion modulated using a second MCS option.

In some implementations, the first packet includes an indication to cause the second WLAN device to the plurality of link adaptation test portions using the corresponding plurality of transmission rate options and provide the feedback information based on the plurality of link adaptation test portions.

In some implementations, the first packet is a dedicated link adaptation test packet having a format specified by a link adaptation protocol.

In some implementations, the first packet includes upper layer data for the second WLAN device in addition to the plurality of link adaptation test portions.

In some implementations, the apparatus includes at least one transceiver coupled to the at least one modem and a plurality of antennas coupled to the at least one transceiver to wirelessly transmit signals output from the at least one transceiver. The apparatus may include a housing that encompasses the at least one modem, the at least one processor, the at least one transceiver and at least a portion of the plurality of antennas.

Another innovative aspect of the subject matter described in this disclosure can be implemented as an apparatus of a second WLAN device. The apparatus may include at least one modem configured to obtain, from a first WLAN device via a wireless channel, a first packet that includes a plurality of link adaptation test portions generated using a corresponding plurality of transmission rate options. The apparatus may include at least one processor communicatively coupled with the at least one modem and configured to determine feedback information based on the plurality of link adaptation test portions in the first packet, the feedback information usable by the first WLAN device to determine a selected transmission rate option for transmission of a subsequent packet from the first WLAN device via the wireless channel. The apparatus may include the at least one modem configured to output the feedback information for transmission to the first WLAN device.

In some implementations, the plurality of transmission rate options includes different MCS options. The plurality of link adaptation test portions may include a first portion modulated using a first MCS and a second portion modulated using a second MCS option.

In some implementations, the apparatus includes at least one transceiver coupled to the at least one modem and a plurality of antennas coupled to the at least one transceiver to wirelessly transmit signals output from the at least one transceiver. The apparatus may include a housing that encompasses the at least one modem, the at least one processor, the at least one transceiver and at least a portion of the plurality of Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6A depicts a block diagram of an example transmitting WLAN device that supports link adaptation.

FIG. 6B depicts a block diagram of an example receiving WLAN device that supports a link adaptation.

Like reference numbers and designations in the various drawings indicate like elements.

DETAILED DESCRIPTION

Figure 1:
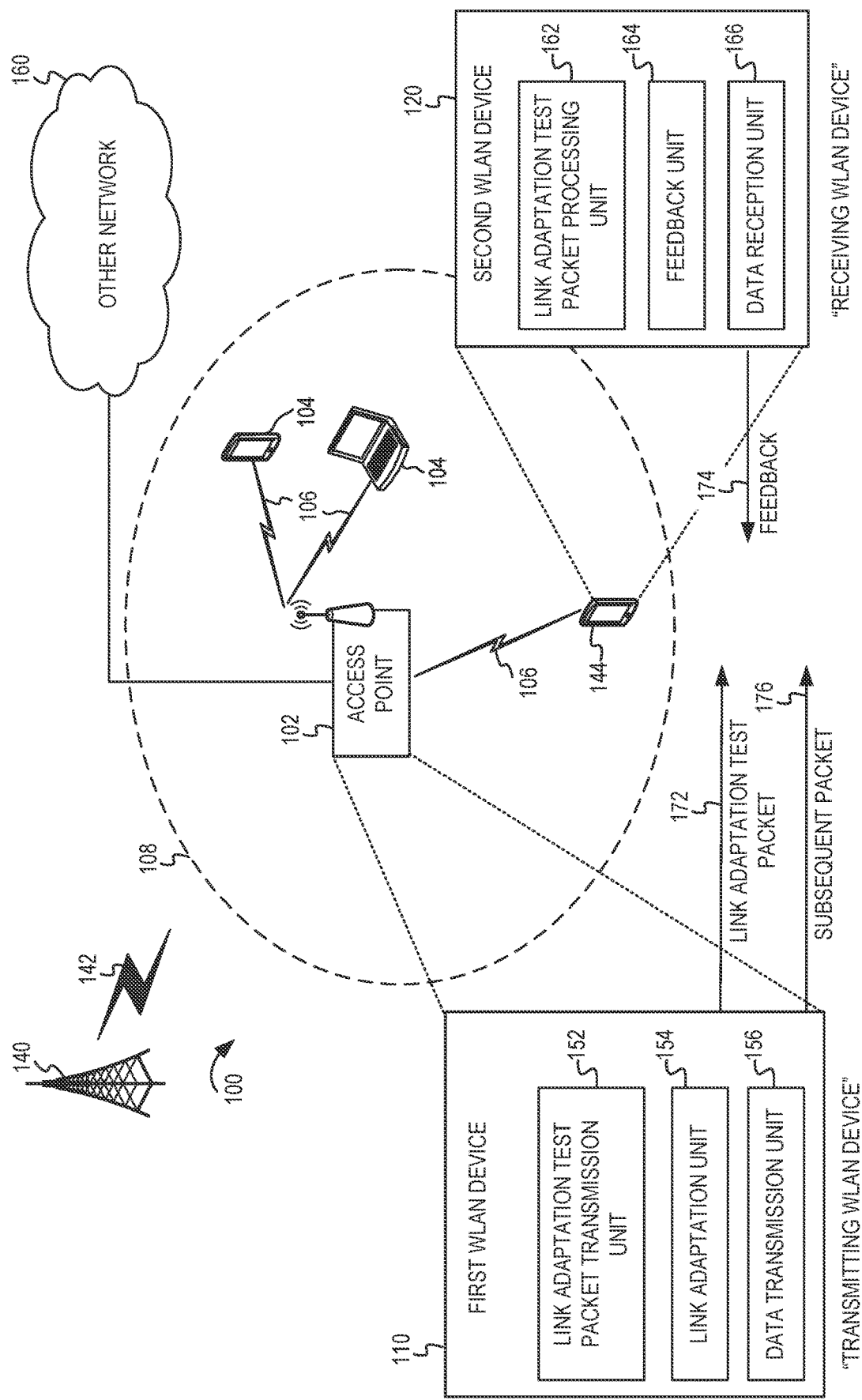
FIG. 1 shows a pictorial diagram of an example wireless communication network that supports the use of a link adaptation test packet.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A WLAN (sometimes also referred to as a Wi-Fi™ network) in a home, apartment, business, or other area may include one or more WLAN devices. An access point (AP) is a WLAN device that includes a distribution system access function. The AP may provide distribution system access for one or more stations (STAs) that are associated with the AP. An AP may provide a wireless coverage area for devices to access the WLAN via a wireless channel. STAs can establish a wireless association (also referred to as a wireless link, wireless connection, or the like) via the channel configuration of an AP to access the WLAN. A transmitting WLAN device (which may be an AP or a STA) may establish a communication link with a receiving WLAN device over a wireless channel.

The conditions of the wireless channel may impact a transmission rate or other parameters of the communication link. Link adaptation (sometimes also referred to as rate adaptation) refers to the determination of the transmission rate (such as selecting a modulation and coding scheme (MCS)) and other parameters for a communication link based on the conditions of a wireless channel. In some implementations, link adaption may include selecting beamforming or a spatial stream configuration for a MIMO transmission. A traditional process for link adaptation requires a series of packets and packet feedback to converge on an optimal transmission rate (such as an optimal MCS). For example, the transmitting WLAN device may use a first selected MCS when sending one or more first packets. The transmitting WLAN device may select a different MCS for later packets based on feedback (such as an acknowledgement or negative acknowledgement) regarding the one or more first packets or based on a packet error rate (PER) associated with the one or more first packets. Thus, the traditional process of selecting an optimal MCS for the communication link may require an inefficient and iterative process over a consecutive series of adjustments. Meanwhile, the channel conditions may change before the WLAN devices converge on the optimal transmission rate. Furthermore, different manufacturers and devices may implement different link adaptation procedures. Performance and channel efficiency may be degraded as a result of traditional ad hoc methods for link adaptation.

This disclosure provides systems, methods, and apparatus, including computer programs encoded on computer-readable media, for link adaptation in a wireless local area network. The techniques in this disclosure may be used in a fast rate adaptation (FRA) protocol for efficiently determining the transmission rate (such as an MCS) and other parameters for a communication link based on the conditions of a wireless channel. Various implementations relate generally to determining a transmission rate for wireless communications from a transmitting WLAN device to a receiving WLAN device. The transmission rate may be defined by, among other parameters, an MCS selected based on channel conditions. A WLAN may support different transmission rate options depending on the channel conditions. In accordance with this disclosure, the transmitting WLAN device may send a first packet as part of a fast rate adaptation protocol. The first packet also may be referred to as a link adaptation test packet (or a "test packet" for short). The test packet may include different portions (also referred to as test portions) associated with different transmission rate options. For example, the test packet may include a first portion modulated using a first MCS and a second portion modulated using a second MCS. The source data encoded in the first portion and the second portion may include testing sequence (such as a predetermined testing sequence) that enables the receiving WLAN device to determine the fidelity of the transmission after decoding the first portion using the first MCS and decoding the second portion using the second MCS. A receiving WLAN device can observe the various portions of the test packet for the predetermined testing sequence using the different MCS and provide feedback information indicative of the decoding success rate for each portion. A transmitting WLAN device may use the feedback information to select a transmission rate option for a later transmission from the first WLAN device to the second WLAN device.

In some implementations, the receiving WLAN device can determine quality metrics for the different test portions corresponding to different transmission rate options in the test packet. The quality metrics (which also may be referred to as link quality metrics or transmission rate quality metrics) may be indicative of the how suitable a transmission rate option is based on the wireless channel conditions. The quality metrics may be based on decoding or signal processing of the various test portions of the test packet. For example, the quality metrics may include log-likelihood ratio (LLR), signal to noise ratio (SNR), signal to interference plus noise (SINR), error vector magnitude (EVM), bit error rate (BER), or block error rate (BLER), among other examples. The receiving WLAN device may send feedback to the transmitting WLAN device in response to the test packet so that the transmitting WLAN device can select an optimal transmission rate for the subsequent transmission. For example, the transmitting WLAN device may select a transmission rate option that corresponds with the test portion having a highest quality metric. Alternatively, or additionally, the transmitting WLAN device may select a transmission rate option that corresponds with the test portion having a highest throughput from among transmission rate options for which the quality metric is above a threshold. In some implementations, the feedback may include separate quality metrics for each of the multiple test portions. Alternatively, or additionally, the feedback may include an indication of a transmission rate option (such as an MCS option) selected by the receiving WLAN device. For example, the receiving WLAN device may select the optimal MCS based on the quality metrics and include an indicator related to the selected MCS in the feedback to the transmitting WLAN device.

In some implementations, the test packet may include the different test portions in a single orthogonal frequency division multiplexed (OFDM) symbol (or a single resource unit of an orthogonal frequency division multiple access (OFDMA) symbol). For example, the single OFDM symbol may include a first tone (or a first set of tones) that have a testing sequence modulated using the first MCS and a second tone (or second set of tones) that have the testing sequence modulated using the second MCS. In some implementations, each tone in the OFDM symbol may be modulated using a different MCS. Alternatively, or additionally, a first OFDM symbol of the test packet may be modulated using a first MCS and a second OFDM symbol of the test packet may be modulated using a second MCS. This disclosure describes several formats and structures of various test packets that can include test portions to evaluate different transmission rate options. For brevity, the test portions may be described in terms of a format structure of a test packet. However, the same or similar concepts may be used in preparation of a test packet such that the test portions are located in various frequency domain or time domain signals of a physical layer transmission.

In some implementations, the test packet may be a new packet format defined in a standard technical specification for the WLAN, such as IEEE 802.11be. In some implementations, the test packet may be based on a packet format for a null data packet (NDP). In some implementations, the test packet may be based on packet format for a data-carrying packet or a contention-based signaling packet (such as a request-to-send (RTS) packet). In some implementations, the test packet may be based on a traditional packet format that includes a padding section. The various portions (modulated with different transmission rate options) may be included in a padding section at the beginning or the end of a traditional packet format. Other alternative formats for the test packet may be possible. In some implementations, the test packet may be communicated as an initial packet of a session so that an optimal transmission rate may be selected for use with subsequent packets of the session. In some implementations, a transmitting WLAN device (such as an AP) may transmit a broadcast test packet with the multiple portions (modulated with different transmission rate options) so that multiple STAs may observe the broadcast test packet. One or more STAs may provide feedback based on the broadcast test packet. The AP may use the feedback to determine which transmission rate option is optimal for each STA that provides the feedback.

Particular implementations of the subject matter described in this disclosure can be implemented to realize one or more of the following potential advantages. A link adaptation test packet may be used to quickly determine an optimal transmission rate option (such as an MCS option) for subsequent transmissions without requiring a series of packets and repetitive transmission rate adjustments to converge on the optimal transmission rate option between a transmitting WLAN device and the receiving WLAN device. Throughput and resiliency may be improved by reducing error rates in transmission that would otherwise use less optimal transmission rate settings. In addition to saving time for link adaptation between a pair of WLAN devices, the use of a single link adaptation test packet to determine an optimal MCS may preserve airtime resources that could otherwise be used for other WLAN devices.

FIG. 1 shows a pictorial diagram of an example wireless communication network 100 that supports the use of a link adaptation test packet. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). The WLAN 100 may provide access to another network 160. For example, the AP 102 may be connected to a gateway device (not shown) which provides connectivity to the other network 160. The WLAN 100 may include numerous wireless communication devices such as at least one access point (AP) 102 and multiple stations (STAs) 104 that may have a wireless association with the AP 102. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (p)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 111. Additionally, two STAs 104 may communicate via a direct communication link 111 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 111 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A STA 144 is associated with the AP 102 and can receive downstream communications from, or transmit upstream communications to, the AP 102 via a communication link 106. A representative downstream communication is described in FIG. 1. To avoid ambiguity, the AP 102 may be referred to as a first WLAN device 110. Alternatively, the first WLAN device 110 may be a wireless communication device in the AP 102. Acting as the transmitting WLAN device, the first WLAN device 110 is capable of communicating the downstream data to a second WLAN device 120 (such as the STA 144). The second WLAN device 120 may be referred to as a receiving WLAN device. Thus, in FIG. 1, the first WLAN device 110 may be referred to as a transmitting WLAN device and the second WLAN device 120 may be referred to as a receiving WLAN device. However, the designations of transmitting WLAN device and receiving WLAN device may be reversed for upstream data (from the STA 144 to the AP 102). Similarly, the techniques in this disclosure may be used with peer-to-peer or mesh networks in which case one WLAN device may be considered a transmitting WLAN device and the other WLAN device may be considered a receiving WLAN device.

FIG. 1 also shows an example of potential interference 142 from an external transmitter 140 (such as a radio broadcast tower, WWAN, or another WLAN, among other examples). The interference 142 may impact channel conditions of the wireless channel used by the BSS managed by the AP 102. The interference 142 may have a greater impact on a high transmission rate (such as a first MCS) and may have a lesser impact on a low transmission rate (such as a second MCS). To provide flexibility of transmission rates, the IEEE 802.11 family of standards specify various MCS options having different modulation and coding rates. The various modulation schemes may include a binary phase shift keying (BPSK) modulation scheme, a quadrature phase shift keying (QPSK) modulation scheme, and different types of a quadrature amplitude modulation (QAM) modulation schemes, among other examples. A code rate may refer to how much of a data stream is actually being used to transmit usable data. A higher code rate means that the data transmission is more efficient. Meanwhile, a lower code rate may result in a more robust transmission because the transmission may include redundant data or error correction data. As described herein, a traditional technique for link adaptation may include an iterative process to sequentially adjust the MCS selection until the WLAN devices converge on an optimal transmission rate that balances data throughput with the amount of interference 142. This disclosure describes a link adaptation technique to determine an optimal MCS between a transmitting WLAN device (such as the first WLAN device 110) and a receiving WLAN device (such as the second WLAN device 120).

The first WLAN device 110 may include a link adaptation test packet transmission unit 152. The link adaptation test packet transmission unit 152 may be configured to transmit a first packet (which may be referred to as a link adaptation test packet 172) to the second WLAN device 120. In some implementations, the link adaptation test packet 172 may be formatted as a single user (SU) basic open loop transmission. Alternatively, the link adaptation test packet 172 may be formatted as multi-user (MU) transmission such as an OFDMA or MU-MIMO transmission. For brevity, the link adaptation test packet 172 described with reference to FIG. 1 is formatted as an SU transmission from the first WLAN device 110 to the second WLAN device 120. The link adaptation test packet 172 may include a plurality of test portions that are modulated using a corresponding plurality of MCS options. For example, a first portion may be modulated using a first MCS and a second portion may be modulated using a second MCS. Thus, a single link adaptation test packet 172 may support testing of a several MCS options based on current channel conditions. Example MCS options are described with reference to FIG. 4. The portions may be based on a time division, frequency division, spatial stream division, or other basis that can be delineated in the first packet. A predetermined testing sequence (such as a bit sequence or pattern) may be used as a consistent source signal for all of the test portions. Thus, the testing signal may be common to all the test portions, such that the MCS option may be the only variable difference between the test portions. In some implementations, the link adaptation test packet 172 also may carry data other than the test portions.

The first WLAN device 110 may include a link adaptation unit 154 that is configured to determine a transmission rate or other link configuration for a subsequent packet 176 for transmission to the second WLAN device 120. For example, the link adaptation unit 154 may receive feedback information 174 from the second WLAN device 120 in response to the link adaptation test packet 172. The link adaptation unit 154 may determine a selected MCS to use for the subsequent packet 176 based on the feedback information 174. In some implementations, the feedback information 174 may include link quality metrics regarding each MCS option in the link adaptation test packet 172. Alternatively, or additionally, the feedback information 174 may include an MCS indicator that indicates the MCS option selected by the second WLAN device 120 based on the link adaptation test packet 172. After the selected MCS option is determined by the link adaptation unit 154, the first WLAN device 110 may transmit subsequent packets 176 using the selected MCS option. Although described in terms of an MCS option, the transmission rate option selected by the link adaptation unit 154 may be any parameter that adapts the transmission rate based on current channel conditions. A data transmission unit 156 in the first WLAN device 110 may modulate the subsequent packet 176 using the transmission rate option selected by the link adaptation unit 154 based on the feedback information 174 regarding the link adaptation test packet 172.

The second WLAN device 120 may include a link adaptation test packet processing unit 162. The link adaptation test packet processing unit 162 may receive the link adaptation test packet 172 and determine link quality metrics for the various test portions in the link adaptation test packet 172. For example, the link adaptation test packet processing unit 162 may process each portion separately to determine a received testing signal for each test portion. The link adaptation test packet processing unit 162 may determine the link quality metrics based on comparisons of the received testing signal with the predetermined testing signal that was used by the first WLAN device 110 for each test portion. Thus, the predetermined testing signal may be a known sequence or pattern that the link adaptation test packet processing unit 162 that can be compared with the received testing signal to determine a BER, BLER, SNR, SINR, or EVM, among other examples.

The second WLAN device 120 may include a feedback unit 164 configured to prepare the feedback information 174. The feedback unit 164 may select an MCS option based on the quality metrics determined by the link adaptation test packet processing unit 162. Alternatively, the feedback unit 164 may prepare a feedback message that includes the quality metrics. A data reception unit 166 in the second WLAN device 120 may receive and process the subsequent packet 176 based on a selected transmission rate option (such as a selected MCS option).

Figure 2:
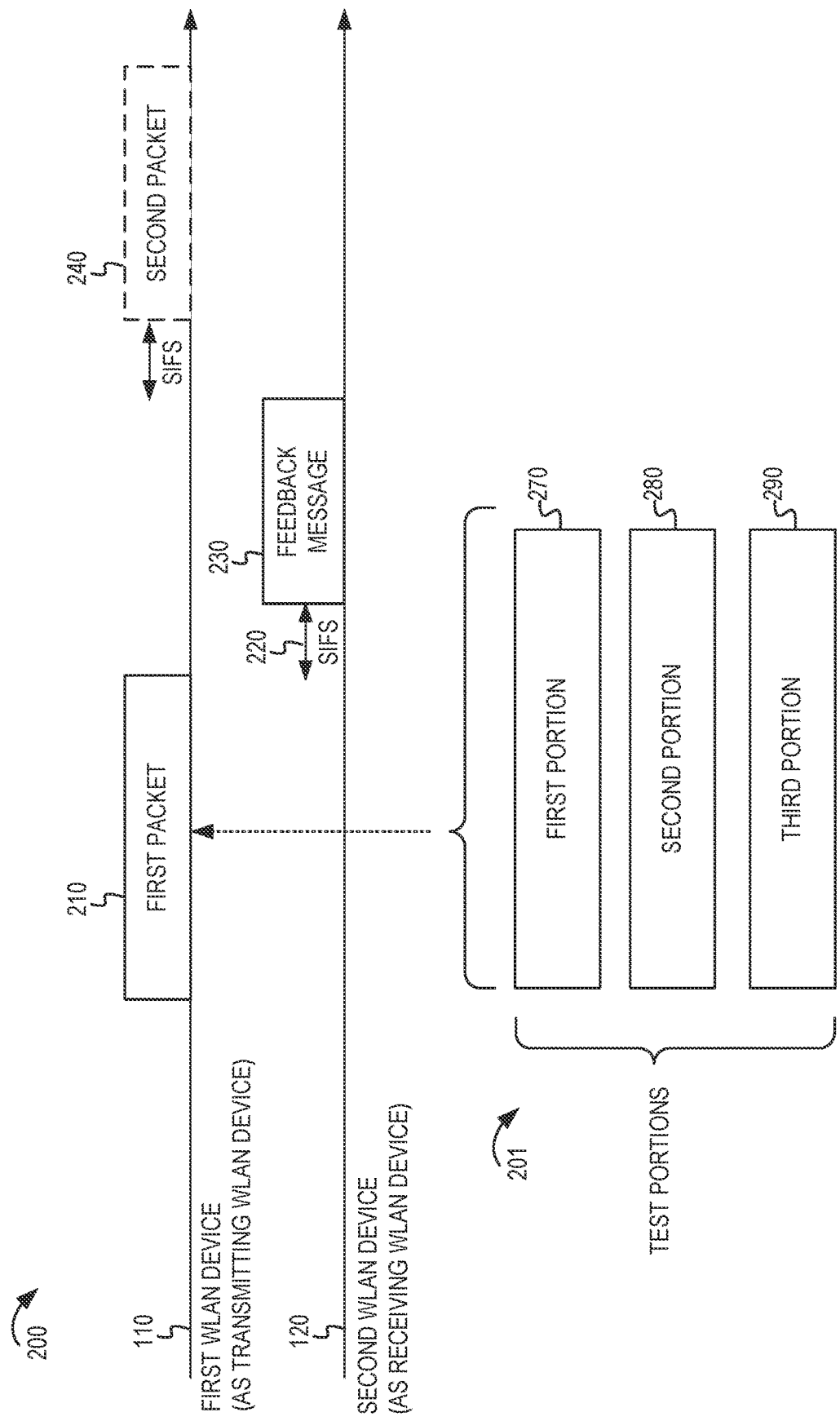
FIG. 2 shows an example link adaptation protocol that uses a link adaptation test packet.

FIG. 2 depicts an example link adaptation protocol that uses a link adaptation test packet. The example link adaptation protocol 200 may begin with a first packet 210 from the first WLAN device 110 to the second WLAN device 120. The first packet 210 may include an indicator to indicate that the first packet includes multiple test portions 201. For example, in some implementations, the first packet 210 may include a link adaptation testing capability or enablement indicator to indicate that the first packet 210 is formatted for use in the link adaptation protocol 200. In some implementations, a testing header in the first packet 210 may indicate which transmission rate options are used for the test portions 201. The transmission rate options may be various MCS options. In the example of FIG. 2, the first packet 210 includes a first portion 270 modulated using a first MCS option, a second portion 280 modulated using a second MCS option, and a third portion 290 modulated using a third MCS option.

Upon receiving the first packet 210, the second WLAN device 120 may determine a success or error rate for each of the test portions 201 to determine which MCS option had a highest throughput and quality above a threshold value. For example, if the first portion 270 and the second portion 280 were both received with a quality above the threshold value, the second WLAN device 120 may determine which MCS option (for the first portion 270 and the 280) would result in a highest data throughput. Meanwhile, if the third portion 290 was received with a quality below the threshold value (such as a high bit error rate indicating lower quality), the second WLAN device 120 may determine that the third MCS option should not be used for a subsequent packet. A low quality MCS may result in retransmissions which consume airtime and result in additional processing overhead. Meanwhile, if multiple MCS options result in a quality metric above the quality threshold, the optimal MCS option is the one that would result in the highest throughput while having acceptable quality above the threshold value.

In response to the first packet 210, the second WLAN device 120 may send a feedback message 230 back to the first WLAN device 110. The feedback message 230 may begin after a short interframe space (SIFS) 220, which represents a determinable time period to maintain synchronization in the WLAN. The feedback message 230 may indicate the quality metrics regarding the test portions 201 or may indicate the optimal transmission rate option selected by the second WLAN device 120 based on the quality and throughput. Based on the feedback information in the feedback message 230, the first WLAN device 110 may determine a selected transmission rate option to use for all or part of a second packet 240 transmitted from the first WLAN device 110 to the second WLAN device 120.

Figure 3:
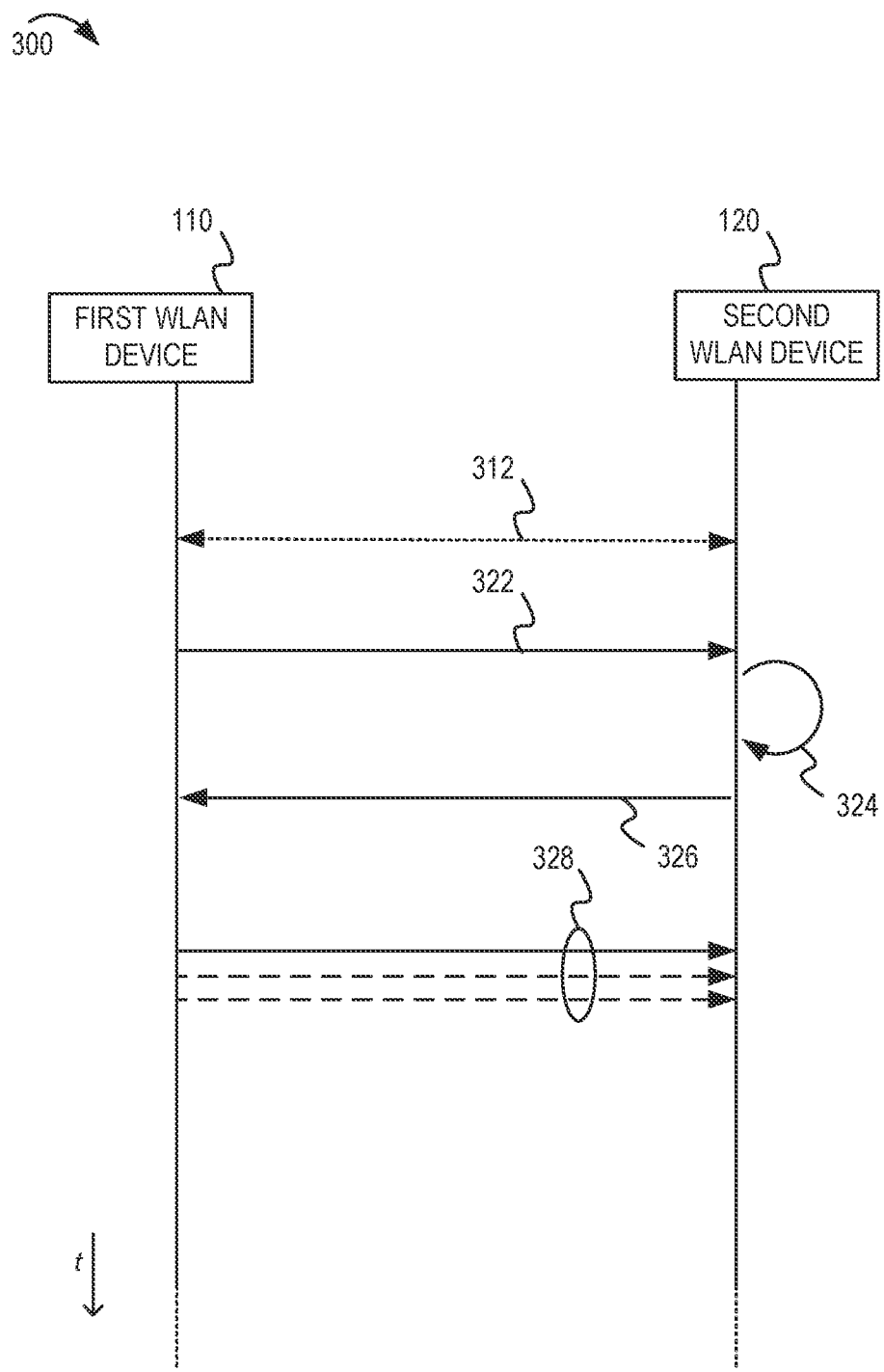
FIG. 3 shows an example message flow diagram of a link adaptation protocol using a link adaptation test packet.

FIG. 3 depicts an example message flow diagram of a link adaptation protocol using a link adaptation test packet. The example message flow 300 shows the first WLAN device 110 (as the transmitting WLAN device) and the second WLAN device 120 (as the receiving WLAN device). The first WLAN device 110 and the second WLAN device 120 may exchange configuration messages 312 to establish a wireless association over a wireless communication medium.

The first WLAN device 110 may transmit a first packet 322 to the second WLAN device 120. The first packet 322 may include multiple test portions that include the same predetermined testing signal modulated using different transmission rate options. The second WLAN device 120 may process (shown at block 324) the first packet 322 to determine quality metrics regarding the test portions as described above. The second WLAN device 120 may transmit feedback information 326 to the first WLAN device 110 based on the first packet 322. Based on the feedback information 326, the first WLAN device 110 may determine a selected transmission rate option (such as an MCS) to use for transmission of subsequent packets 328 to the second WLAN device 120.

Figure 4:
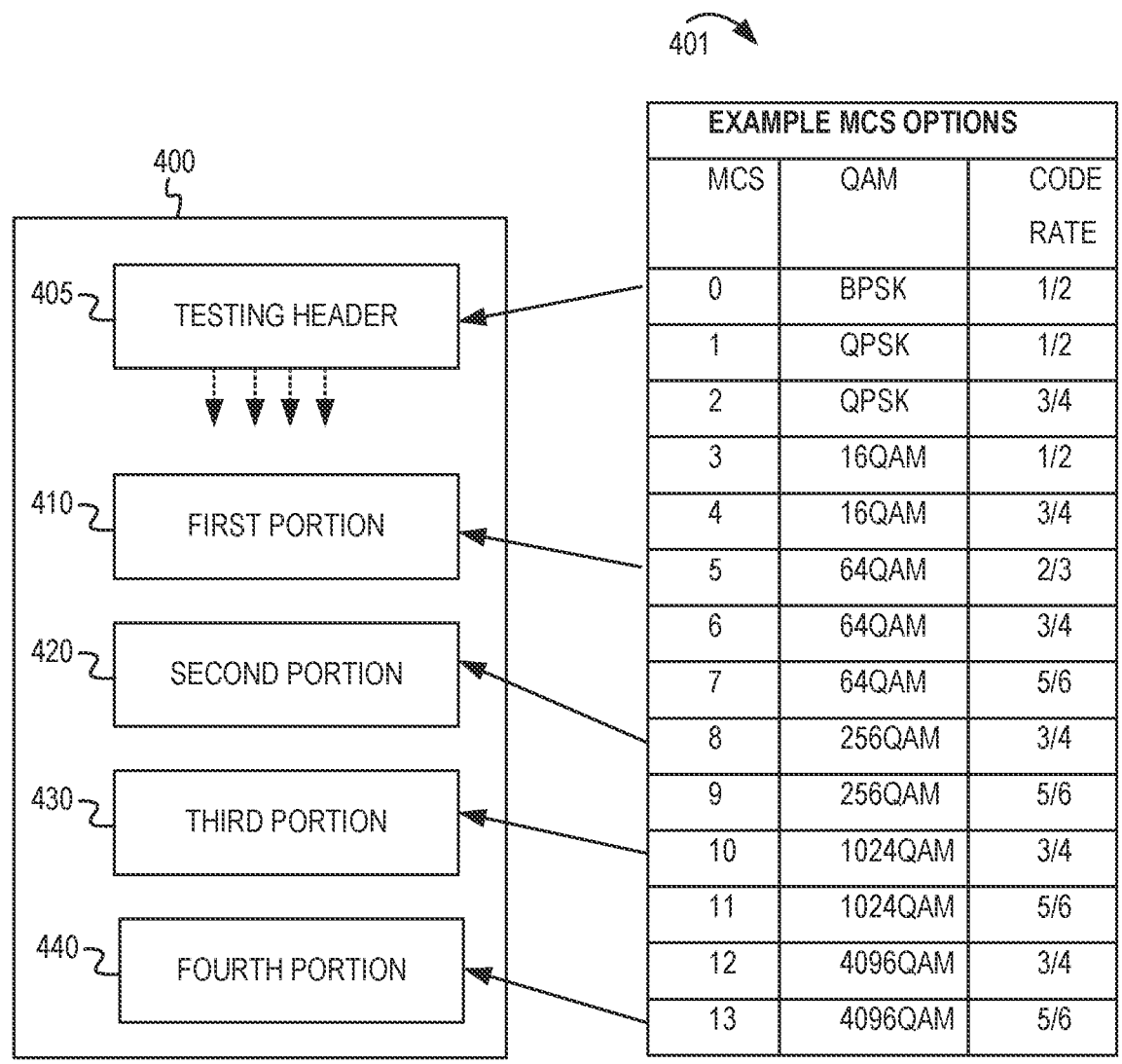
FIG. 4 shows an example link adaptation test packet and example corresponding modulation and coding scheme (MCS) options.

FIG. 4 shows an example link adaptation test packet and example corresponding MCS options. The link adaptation test packet 400 may include a testing header 405 and multiple test portions 410, 420, 430, and 440. Although only four test portions are depicted in FIG. 4, the quantity of test portions may be different. For example, in some implementations, the link adaptation test packet 400 may include a test portion for each MCS option defined by a standard technical specification for the WLAN.

The chart 401 in FIG. 4 shows example MCS options. The chart 401 shows fourteen MCS options (numbered MCS 0 to MCS 13), each having a different combination of modulation scheme and forward error correction (FEC) code rate (sometimes referred to as code rate). The various modulation schemes may include a binary phase shift keying (BPSK) modulation scheme, a quadrature phase shift keying (QPSK) modulation scheme, and different types of a quadrature amplitude modulation (QAM) modulation schemes, among other examples. The forward error correction code rate may impact how much of a data stream is actually being used to transmit usable data. For example, a code rate of 5/6 means that 83.3% of a transmitted data stream includes actual data (or every five out of six bits are information bits with the remaining bits are parity bits). A higher code rate means that the data transmission is more efficient. Meanwhile, a lower code rate may result in a more robust transmission because the transmission may include redundant data or error correction data, among other examples. Based on the chart 401, the data throughput may increase as a number for the MCS option increases. For example, MCS 13 has a higher data throughput than MCS 0. However, the higher numbered MCS options are more susceptible to errors caused by interference or poor radio conditions.

In some implementations, the testing header 405 may signal to the receiving WLAN device that the link adaptation test packet 400 includes the test portions 410, 420, 430, and 440. Additionally, or alternatively, the testing header 405 may indicate which MCS options are used to modulate the different test portions 410, 420, 430, and 440. In the example of FIG. 4, a first portion 410 includes a known testing signal that is modulated using MCS 5 (which refers to a combination of a 64QAM modulation scheme and a 2/3 code rate). A second portion 420 includes the same known testing signal that is modulated using MCS 8 (which refers to a combination of a 256QAM modulation scheme and a 3/4 code rate). A third portion 430 includes the same known testing signal that is modulated using MCS 10 (which refers to a combination of a 1024QAM modulation scheme and a 3/4 code rate). A fourth portion 440 includes the same known testing signal that is modulated using MCS 13 (which refers to a combination of a 4096QAM modulation scheme and a 5/6 code rate). Thus, a single link adaptation test packet 400 may be used to determine which MCS option results in an optimal data throughput based on current wireless channel conditions.

Figure 5A:
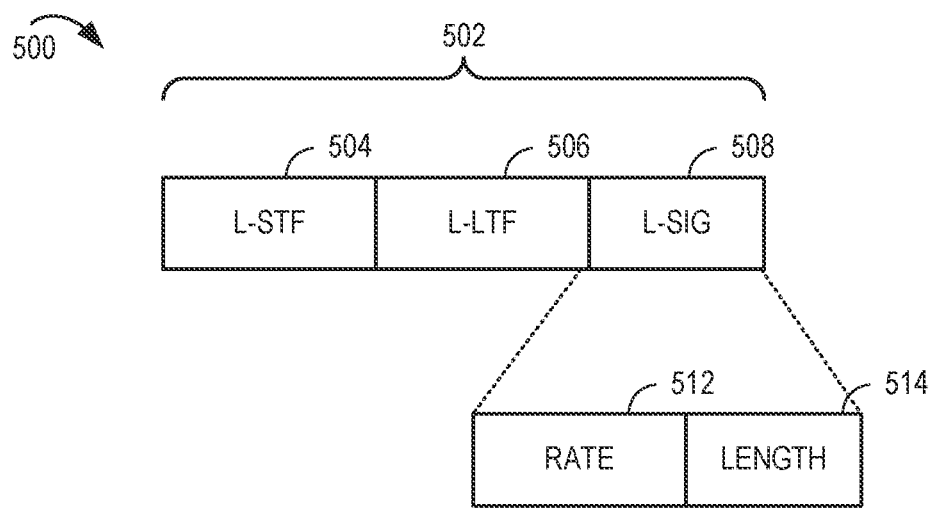
FIG. 5A depicts a first example feedback message format.

FIG. 5A depicts a first example feedback message format. The first example feedback message format 500 may be based on a legacy preamble associated with legacy WLAN frame format 502. The feedback message format 500 may include a legacy short training field 504 (L-STF), a legacy long training field 506 (L-LTF), and a legacy signal field 508 (L-SIG). The L-STF and the L-LTF are used for detection and synchronization using predetermined training signals. Thus, the L-SIG field is the only portion of the legacy preamble which carries data. The L-SIG field includes a set of bits for indicating a rate setting 512 and a set of bits for indicating a length 514 of the legacy WLAN packet that would normally follow the legacy preamble. In the example, of FIG. 5A, the feedback message may end with the L-SIG. Therefore, the length 514 may indicate a value of "0." The rate setting 512 may indicate a selected MCS option determined by the receiving WLAN device based on quality metrics for the test portions of a link adaptation test packet.

Figure 5B:
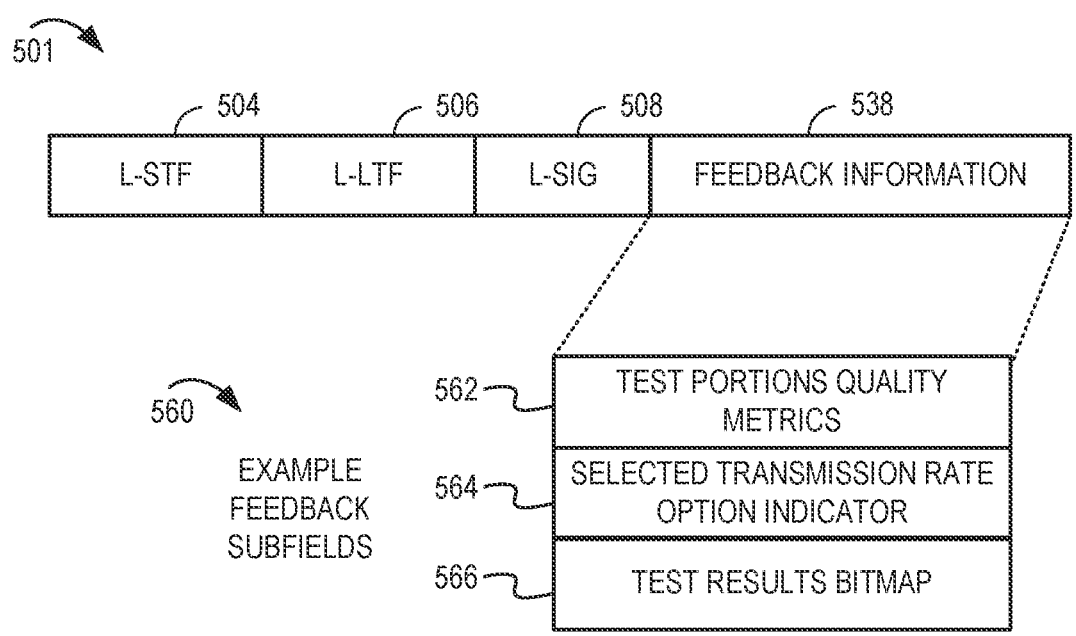
FIG. 5B depicts a second example feedback message format.

FIG. 5B depicts a second example feedback message format. The second example feedback message format 501 may be based on a legacy preamble (L-STF 504, L-LTF 506, and L-SIG 508) followed by feedback information 538. There may be different subfields in the feedback information 538. FIG. 5B shows several example feedback subfields 560, including a test portions quality metrics 562, a selected transmission rate option indicator 564, and test results bitmap 566. The test portions quality metrics 562 may indicate quality metrics for each test portion. For example, the test portions quality metrics 562 may include a BER, BLER, SINR, SNR, EVM, or other quality metric which indicates how well the received test signal for each test portion compares with the known test signal. The selected transmission rate option indicator 564 may indicate a selected MCS or other transmission rate parameter chosen by the receiving WLAN device based on analyzing the test portions of a link adaptation test packet. The test results bitmap 566 may indicate which test portions were successfully decoded. For example, each bit in the bitmap may provide a success or failure indication for each test portion. A first value (zero) may indicate that the test portion was not successfully decoded (or was received with a low quality). A second value (one) may indicate that the test portion was successfully decoded (and was received with a high quality). The examples in FIGS. 5A and 5B are intended as illustrative examples, and other variations may be possible.

FIG. 6A depicts a block diagram of an example transmitting WLAN device that supports link adaptation. The example transmitting WLAN device 600 is one of many designs for a first WLAN device. The example transmitting WLAN device 600 is based on a transmitter that supports transmission of user data as well as a link adaptation testing signal. The transmitting WLAN device 600 is designed for binary convolutional coding (BCC) encoding. Another design (not shown) may support low data parity check (LDPC) encoding. The transmitting WLAN device 600 in FIG. 6A supports the transmission of data 602. The data 602 may be processed by a scrambler 610 and an encoding module 615. The scrambler 610 may scramble the data 602 to reduce the probability of long sequences of zeros or ones. The scrambler 610 may use a seed to determine the scrambled bits. The seed may be known or shared with the receiving WLAN device so that the receiving WLAN device can reverse the scrambling process performed by the scrambler 610. After scrambling, the data may be processed by the encoding module 615.

In the design described in FIG. 6A, a testing signal generator 605 may send one or more copies of a predetermined testing signal for processing by the transmitter apparatus. The testing signal may be sent in lieu of the data 602, or may be sent for encoding in part of a same packet that includes the data 602. The predetermined testing signal may be processed by the encoding module 615. In some implementations, the testing signal may be a known sequence that can be designed to avoid the need to scramble the bits. Therefore, in some implementations, the testing signal may not be processed by the scrambler 610.

The encoding module 615 may perform encoding for error correction and error detection. For example, the encoding module 615 may perform FEC and add redundancy or CRC bits to the source data. The encoder may use BCC to encode the data. The encoded data may be sent to a stream parser 620 that divides the encoded data into Nss spatial streams. In some implementations, there may only be one spatial stream and the stream parser 620 may be unused. An example of spatial stream processing 640 may include an interleaver 630, and a constellation mapper 635. The interleaver 630 interleaves the bits of each spatial stream (changes order of bits) to prevent long sequences of adjacent noisy bits from entering the BCC decoder. The interleaver 630 may be present in transmitter designs that use BCC encoding. When LDPC encoding is used (rather than BCC), the interleaver 630 may be omitted. Interleaving is applied only when BCC encoding is used. The constellation mapper 635 maps the sequence of bits in each spatial stream to constellation points (complex numbers). The constellation mapper 635 may perform the modulation of the bits based on the selected MCS option. For example, the constellation mapper 635 may determine the constellation points for modulation based on a modulation scheme for the MCS option. For each portion of the link adaptation test packet, the constellation mapper 635 may use a different MCS option.

After the spatial streams are processed, a spatial mapping 645 may map space-time streams to $N_{TX}$ transmit chains (including TX chain 650). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping 645 may support beamforming (like spatial expansion), in which each vector of constellation points from all of the space-time streams is multiplied by a matrix of steering vectors to produce the input to the transmit chains.

Each TX chain 650 may prepare a plurality of OFDM symbols based on the constellation points. For example, the TX chain 650 may include an inverse discrete Fourier transform (IDFT) that converts a block of constellation points to a time domain block. The TX chain 650 may include a cyclic shift (CSD), guard interval inserter, and an analog front end to transmit OFDM symbols as radio frequency (RF) energy.

The transmitting WLAN device 600 described in FIG. 6A is only one example of a transmitter apparatus. Other block diagrams may add or remove functional blocks.

FIG. 6B depicts a block diagram of an example receiving WLAN device that supports a link adaptation. The example receiving WLAN device 601 is one of many possible designs for second WLAN device. In the example of FIG. 6B, RF energy may be received by an analog front end of a receive (RX) chain 655. For example, the RX chain 655 may include an antenna and automatic gain control (AGC) components (not shown). Furthermore, the RX chain 655 may include a fast Fourier transform (FFT) function to convert time domain symbols to a frequency domain representation of received data. $N_{RX}$ receive chains may prepare frequency domain representations of received data associated with each RX chain. Each spatial stream may be processed by a demodulation module 660. In accordance with this disclosure, the demodulation module 660 may use different MCS options to demodulate different portions of the link adaptation test packet. The demodulation module 660 may convert the frequency domain representations into a plurality of spatial streams. As a result, the demodulation module 660 may provide Nss spatial streams. An example of spatial stream processing 672 may include a deinterleaver 665 and a demodulator 672. If BCC interleaver was used in the transmitting WLAN device 600, the deinterleaver 665 may perform a de-interleaving of the bitstream to recover an original ordering of the bitstream. The demodulator 670 may use LLR calculations to recover a bit stream. A stream combiner 675 may reverse the process of the stream parser 620 of the transmitter. For example, the stream combiner 675 may combine bitstreams from multiple spatial streams to prepare encoded data bits for a decoding module 680. The decoding module 680 may decode the encoded bits. In some implementations, the decoding module 680 may implement error correction using redundancy bits in the encoded bits. The decoding module 680 may send a received testing signal to a testing signal comparator 695. The testing signal comparator 695 may compare the received testing signal for each test portion with the known testing signal to determine a fidelity or quality metric associated with the test portion.

In some implementations, the example receiving WLAN device 601 may be configured to receive data 698 in addition to the testing signal. The decoding module 680 may send received data to a descrambler 690. The descrambler 690 may reverse the scrambling performed by the scrambler in the transmitting WLAN device. The descrambler 690 may provide the received data 698 to an upper layer (not shown) of the example receiving WLAN device 601.

Figure 7:
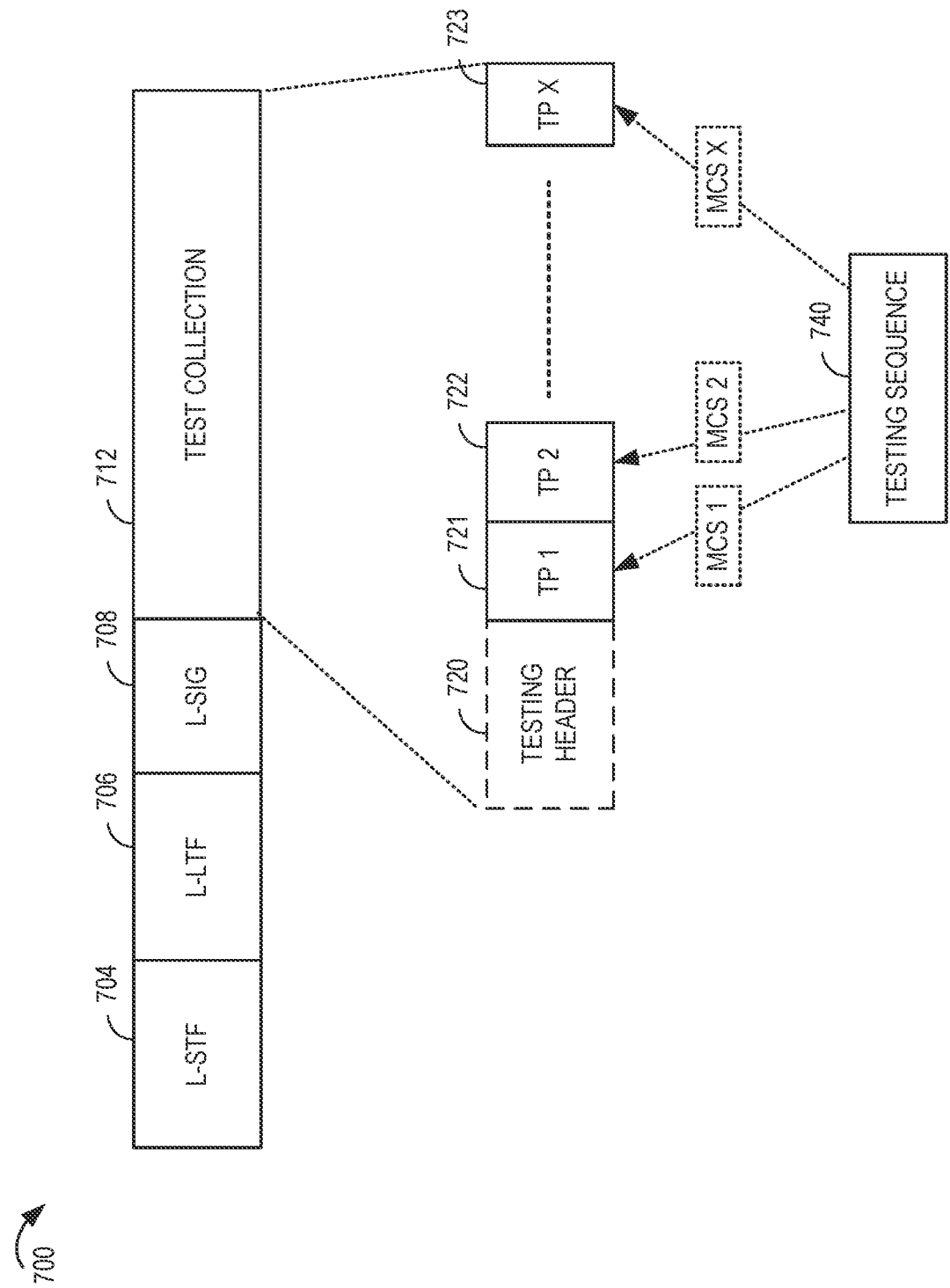
FIG. 7 depicts an example link adaptation test packet using time division for test portions.

FIG. 7 depicts an example link adaptation test packet 700 using time division for test portions. For example, the link adaptation test packet 700 can be formatted as a PPDU. As shown, the link adaptation test packet 700 includes a preamble and the test collection 712. For example, the preamble may be a PHY preamble and may include a legacy portion that itself includes a legacy short training field (L-STF) 704, a legacy long training field (L-LTF) 706, and a legacy signaling field (L-SIG) 708. The preamble also may include a non-legacy portion (not shown). The L-STF 704 generally enables a receiving device to perform automatic gain control (AGC) and coarse timing and frequency estimation. The L-LTF 706 generally enables a receiving device to perform fine timing and frequency estimation and also to estimate the wireless channel. The L-SIG 708 generally enables a receiving device to determine a duration of the PPDU and use the determined duration to avoid transmitting on top of the PPDU. For example, the L-STF 704, the L-LTF 706 and the L-SIG 708 may be modulated using a robust MCS option, such as one that uses a BPSK modulation scheme. Following the preamble, the link adaptation test packet 700 may include one or more other headers (not shown) and test collection 712. The test collection 712 may include a testing header 720 to indicate which MCS options are used to modulate the test portions 721, 722, and 723. The test portions 721, 722, and 723 may be based on the same testing sequence 740 but modulated using different MCS options. As shown in FIG. 7, the test portions may be ordered in time division in the test collection 712 section of the link adaptation test packet 700. In some implementations, each test portion may be one or more OFDM symbols in a series of OFDM symbols that make up the link adaptation test packet 700.

Figure 8:
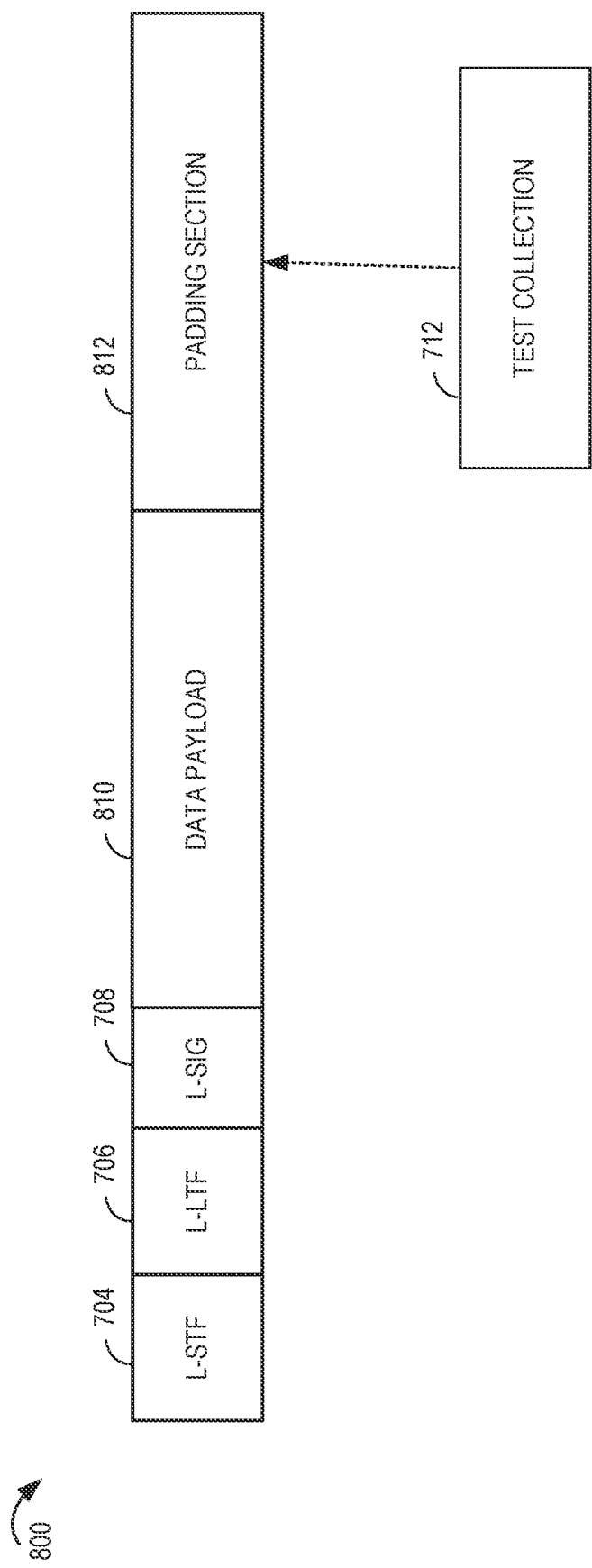
FIG. 8 depicts an example link adaptation test packet in which the testing signals are included in a padding section of a data carrying packet.

FIG. 8 depicts an example link adaptation test packet 800 in which the testing portions are included in a padding section of a data carrying packet. Similar to the link adaptation test packet 700, the link adaptation test packet 800 may include a preamble (such as the L-STF 704, the L-LTF 706, and the L-SIG 708). However, different from the link adaptation test packet 700, the link adaptation test packet 800 may be a data carrying packet that includes a data payload 810. For example, the data payload 810 may include data for the second WLAN device. The data payload 810 may be modulated by a less optimal MCS option or may be modulated based on a previously selected MCS option. Following the data payload 810, typically the PPDU would include a padding section 812. However, in some implementations, the padding section 812 maybe populated with the test portions (such as the test collection 712 as described with reference to FIG. 7). Although illustrated as following the data payload 810 in FIG. 8, in some implementations the test collection 712 may be included before data payload 810. The data payload 810 may be a separate portion that is different from the test portions in the test packet.

Figure 9A:
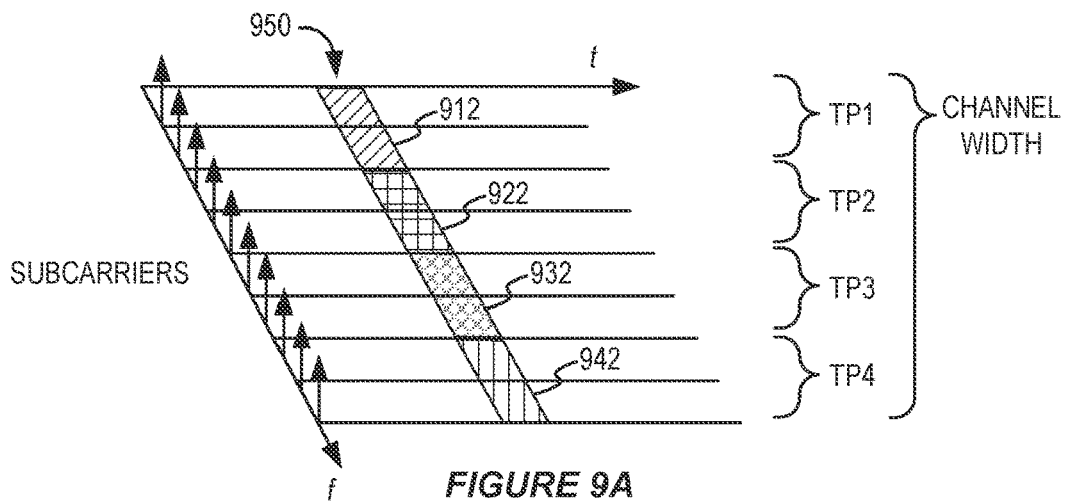
FIG. 9A shows an example conceptual diagram in which an orthogonal frequency division multiplexing (OFDM) symbol includes multiple link adaptation test portions.

FIG. 9A shows an example conceptual diagram in which an OFDM symbol includes multiple link adaptation test portions. The OFDM channel width may include multiple subcarriers. The subcarriers also may be referred to as tones. A WLAN packet (also referred to as a PPDU) includes data that is encoded using the subcarriers of the channel width. A PPDU may be different lengths of time and include multiple OFDM symbols. In some implementations, a transmitting WLAN device may include one OFDM symbol (such as OFDM symbol 950) that has different test portions modulated using a different MCS. For example, the OFDM symbol 950 in FIG. 9A includes four test portions 912, 922, 932, and 942 which may be referred to as test portion 1 (TP1), TP2, TP3, and TP4, respectively. Each test portion may be modulated using a different MCS so that a variety of MCS options can be included in the OFDM symbol 950. Each test portions may be a set of contiguous subcarriers (as shown in FIG. 9A) or may be a set of non-contiguous subcarriers (so that the full channel width may have different subcarriers modulated with the MCS option for each test portion). In some implementations, the test portions may be made up of only one subcarrier each. For example, the test portions TP1, TP2, TP3, and TP4 may be one subcarrier each. The remaining subcarriers may be used for data or other signaling.

Figure 9B:
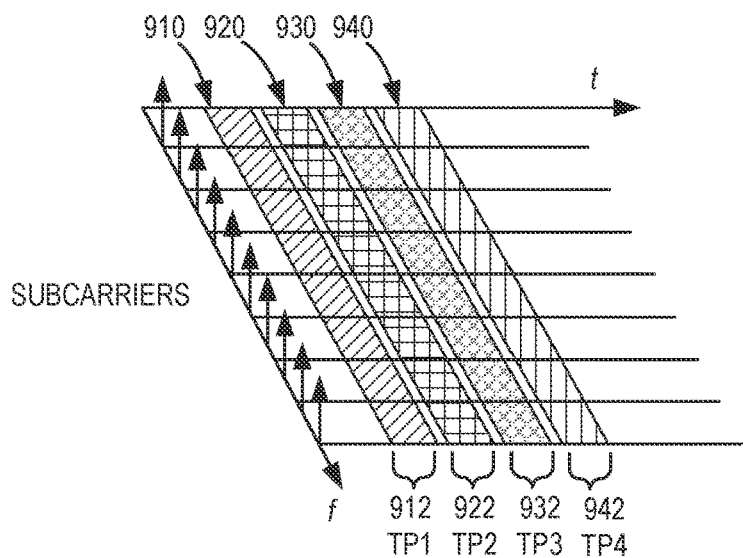
FIG. 9B shows an example conceptual diagram in which multiple OFDM symbols may be used for a link adaptation test packet.

FIG. 9B shows an example conceptual diagram in which multiple OFDM symbols may be used for a link adaptation test packet. For example, a first OFDM symbol 910 may include a first test portion (TP1) 912. A second OFDM symbol 920 may include a second test portion (TP2) 922. A third OFDM symbol 930 may include a third test portion (TP3) 932. A fourth OFDM symbol 940 may include a fourth test portion (TP4) 942. Each of the test portions 912, 922, 932, and 942 may be modulated with a different MCS.

Figure 9C:
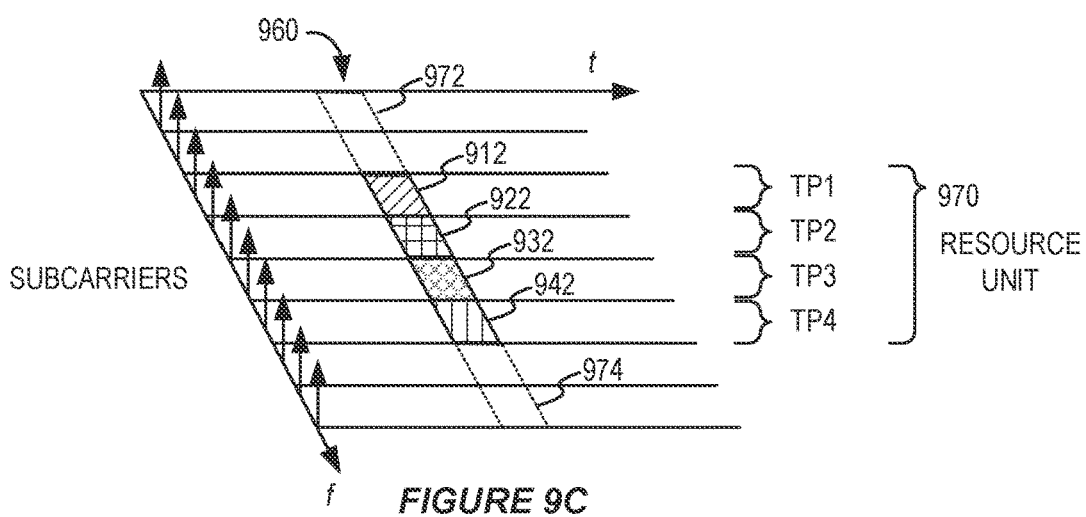
FIG. 9C shows an example conceptual diagram in which the link adaptation test portions are included in a resource unit of an orthogonal frequency division multiple access (OFDMA) transmission.

FIG. 9C shows an example conceptual diagram in which the test portions are included in a resource unit of an OFDMA transmission. IEEE 802.11ax introduced the use of OFDMA in a WLAN. OFDMA breaks down the channel width into a plurality of resource units (RUs). Each RU may include a different quantity of subcarriers. Using OFDMA, an AP may allocate different RUs for different WLAN devices. For example, a PPDU 960 may include different RUs allocated for a first WLAN device, a second WLAN device, a third WLAN device, and a fourth WLAN device. One RU 970 may be allocated for a first WLAN device in the PPDU 960, while other RUs 972 and 974 are allocated for different WLAN devices. The allocation of RUs also may be used to schedule channel access. For example, a trigger message from an AP may indicate which RUs are allocated to particular STAs to use for uplink traffic in the PPDU that follows the trigger message.

In the example shown in FIG. 9C, a first RU 970 may include link adaptation test portions from a first WLAN device (such as an AP) to a second WLAN device (such as a STA). Thus, the RU 970 may be divided by frequency division to support different test portions 912, 922, 932, and 942. The test portions 912, 922, 932, and 943 may occupy different tones (or sets of tones) within the RU 970. Each test portion may be modulated using a different MCS option.

The concepts described in FIGS. 9A, 9B, and 9C are illustrative examples and are not mutually exclusive. For example, when a PPDU includes multiple OFDM symbols, each OFDM symbol may carry user data or other signaling in some subcarriers and a test portion in other subcarriers. Furthermore, a series of OFDM symbols may be used to communicate test portions which occupy subsets of the subcarriers in each OFDM symbol. The quantity and size of the test portions in FIGS. 9A-9C may vary and may depend on the quantity of MCS options being evaluated in the link adaptation test packet.

Figure 10:
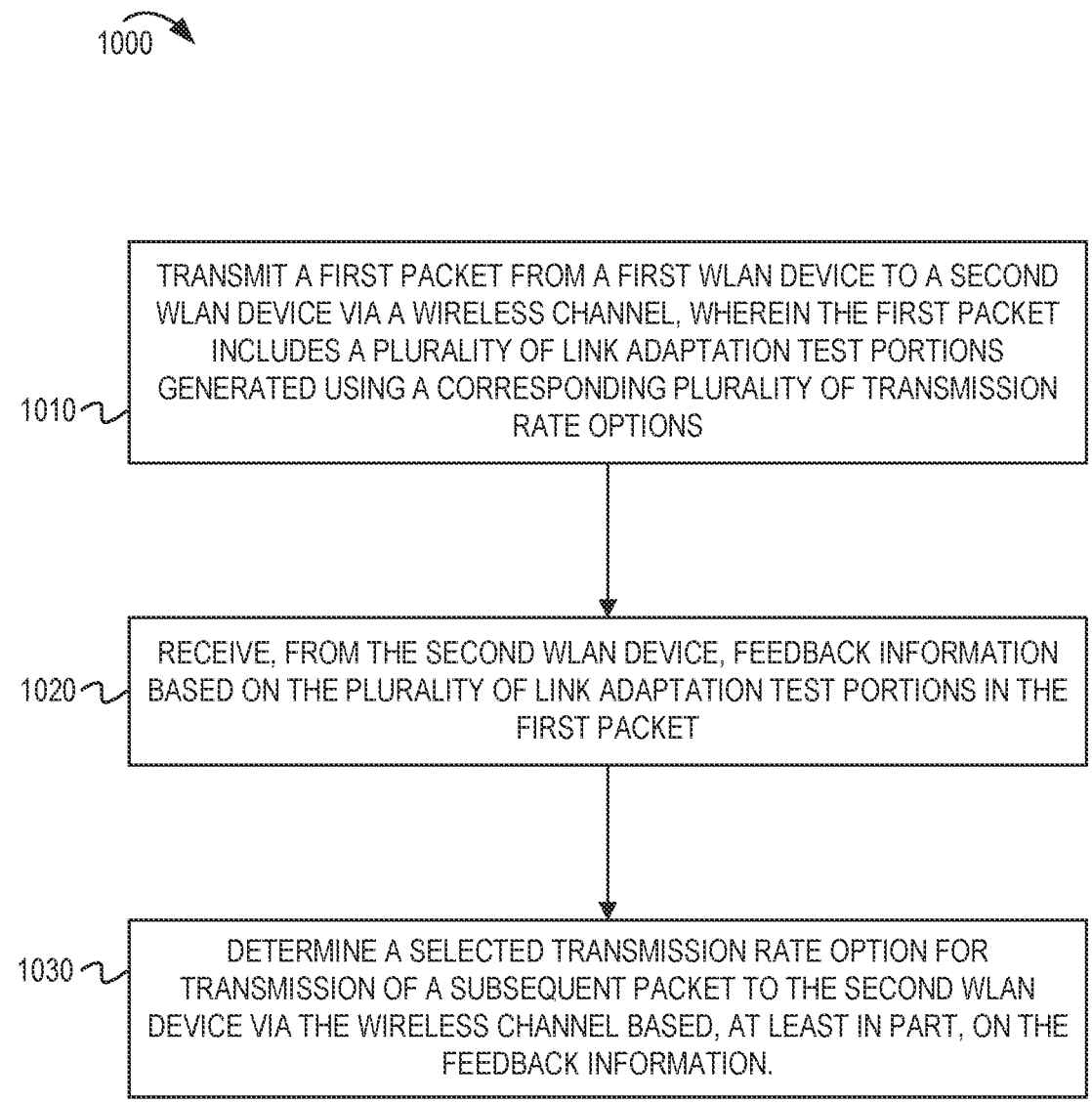
FIG. 10 shows a flowchart illustrating an example process by a transmitting WLAN device to support link adaptation.

FIG. 10 shows a flowchart illustrating an example process 1000 by transmitting WLAN device to support link adaptation. In some implementations, the process 1000 may be performed by a first WLAN device such as the AP 102 described above. In some implementations, the process 1000 begins in block 1010.

In block 1010, a first WLAN device may transmit a first packet from a first WLAN device to a second WLAN device via a wireless channel. The first packet may include a plurality of link adaptation test portions generated using a corresponding plurality of transmission rate options. For example, a first portion may be modulated using a first MCS and a second portion may be modulated using a second MCS.

In block 1020, the first WLAN device may receive, from the second WLAN device, feedback information based on the plurality of link adaptation test portions in the first packet.

In block 1030, the first WLAN device may determine a selected transmission rate option for transmission of a subsequent packet to the second WLAN device via the wireless channel based, at least in part, on the feedback information.

In some implementations, each of the plurality of link adaptation test portions is modulated using a different MCS option. The feedback information may include an LLR metric indicative of a decoding success rate for each of the plurality of link adaptation test portions. Alternatively, or additionally, the feedback information may include a link quality metric (such as SINR or EVM) that is indicative of a link quality associated with each of the plurality of link adaptation test portions. In some implementations, the first WLAN device may select an MCS option associated with a link adaptation test portion having a highest throughput and for which the corresponding LLR metric is above a threshold.

Figure 11:
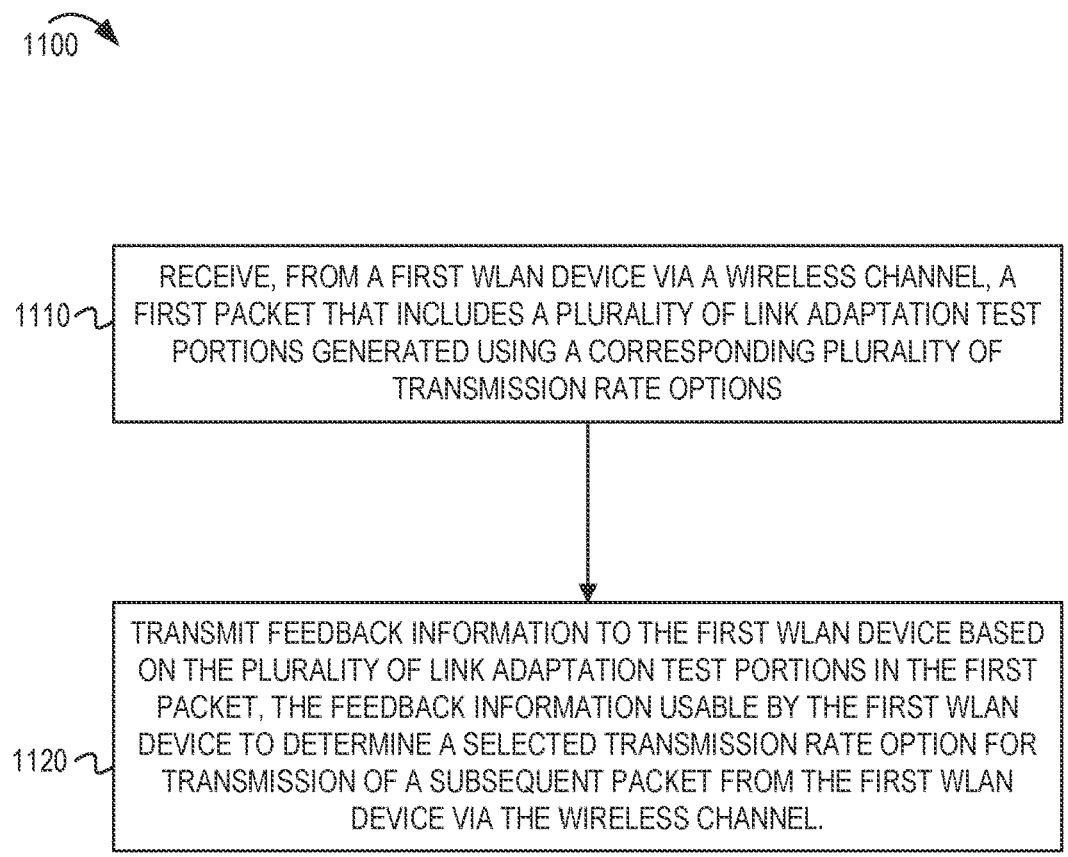
FIG. 11 shows a flowchart illustrating an example process by a receiving WLAN device to support link adaptation.

FIG. 11 shows a flowchart illustrating an example process 1100 by a receiving WLAN device to support link adaptation. In some implementations, the process 1100 may be performed by a second WLAN device such as second WLAN device 120 described above. In some implementations, the process 1100 begins in block 1110. In block 1110, the second WLAN device may receive, from a first WLAN device via a wireless channel, a first packet that includes a plurality of link adaptation test portions generated using a corresponding plurality of transmission rate options. For example, a first portion may be modulated using a first MCS and a second portion may be modulated using a second MCS.

In block 1120, the second WLAN device may transmit feedback information to the first WLAN device based on the plurality of link adaptation test portions in the first packet. The feedback information may be usable by the first WLAN device to determine a selected transmission rate option for transmission of a subsequent packet from the first WLAN device via the wireless channel.

Figure 12:
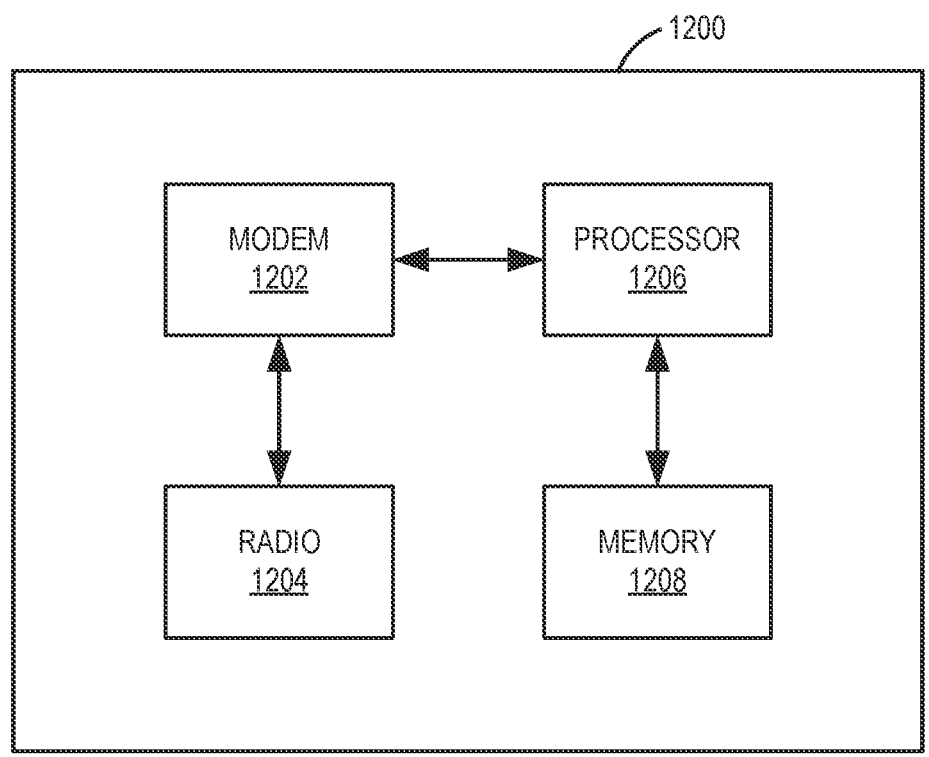
FIG. 12 shows a block diagram of an example wireless communication device.

FIG. 12 shows a block diagram of an example wireless communication device 1200. In some implementations, the wireless communication device 1200 can be an example of a device for use in a STA such as one of the STAs 104 or 144 described above with reference to FIG. 1. In some implementations, the wireless communication device 1200 can be an example of a device for use in an AP such as the AP 102 described above with reference to FIG. 1. The wireless communication device 1200 may be used as a transmitting WLAN device or receiving WLAN device (such as the first WLAN device 110 and the second WLAN device 120, respectively). The wireless communication device 1200 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11 ay, 802.11ax, 802.11az, 802.11ba and 802.11be.

The wireless communication device 1200 can be, or can include, a chip, system on chip (SoC), chipset, package or device that includes one or more modems 1202, for example, a Wi-Fi (IEEE 802.11 compliant) modem. In some implementations, the one or more modems 1202 (collectively "the modem 1202") additionally include a WWAN modem (for example, a 3GPP 4G LTE or 5G compliant modem). In some implementations, the wireless communication device 1200 also includes one or more radios 1204 (collectively "the radio 1204"). In some implementations, the wireless communication device 1200 further includes one or more processors, processing blocks or processing elements 1206 (collectively "the processor 1206") and one or more memory blocks or elements 1208 (collectively "the memory 1208").

The modem 1202 can include an intelligent hardware block or device such as, for example, an application-specific integrated circuit (ASIC) among other possibilities. The modem 1202 is generally configured to implement a PHY layer. For example, the modem 1202 is configured to modulate packets and to output the modulated packets to the radio 1204 for transmission over the wireless medium. The modem 1202 is similarly configured to obtain modulated packets received by the radio 1204 and to demodulate the packets to provide demodulated packets. In addition to a modulator and a demodulator, the modem 1202 may further include digital signal processing (DSP) circuitry, automatic gain control (AGC), a coder, a decoder, a multiplexer and a demultiplexer. For example, while in a transmission mode, data obtained from the processor 1206 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1204. In implementations involving beamforming, the modulated symbols in the respective spatial streams are precoded via a steering matrix prior to their provision to the IFFT block.

While in a reception mode, digital signals received from the radio 1204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1206) for processing, evaluation, or interpretation.

The radio 1204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 1200 can include, or be coupled with, multiple transmit antennas (each with a corresponding transmit chain) and multiple receive antennas (each with a corresponding receive chain). The symbols output from the modem 1202 are provided to the radio 1204, which then transmits the symbols via the coupled antennas. Similarly, symbols received via the antennas are obtained by the radio 1204, which then provides the symbols to the modem 1202.

The processor 1206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1206 processes information received through the radio 1204 and the modem 1202, and processes information to be output through the modem 1202 and the radio 1204 for transmission through the wireless medium. For example, the processor 1206 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1206 may generally control the modem 1202 to cause the modem to perform various operations described above.

The memory 1208 can include tangible storage media such as random-access memory (RAM) or read-only memory (ROM), or combinations thereof. The memory 1208 also can store non-transitory processor- or computer-executable software (SW) code containing instructions that, when executed by the processor 1206, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 13B:
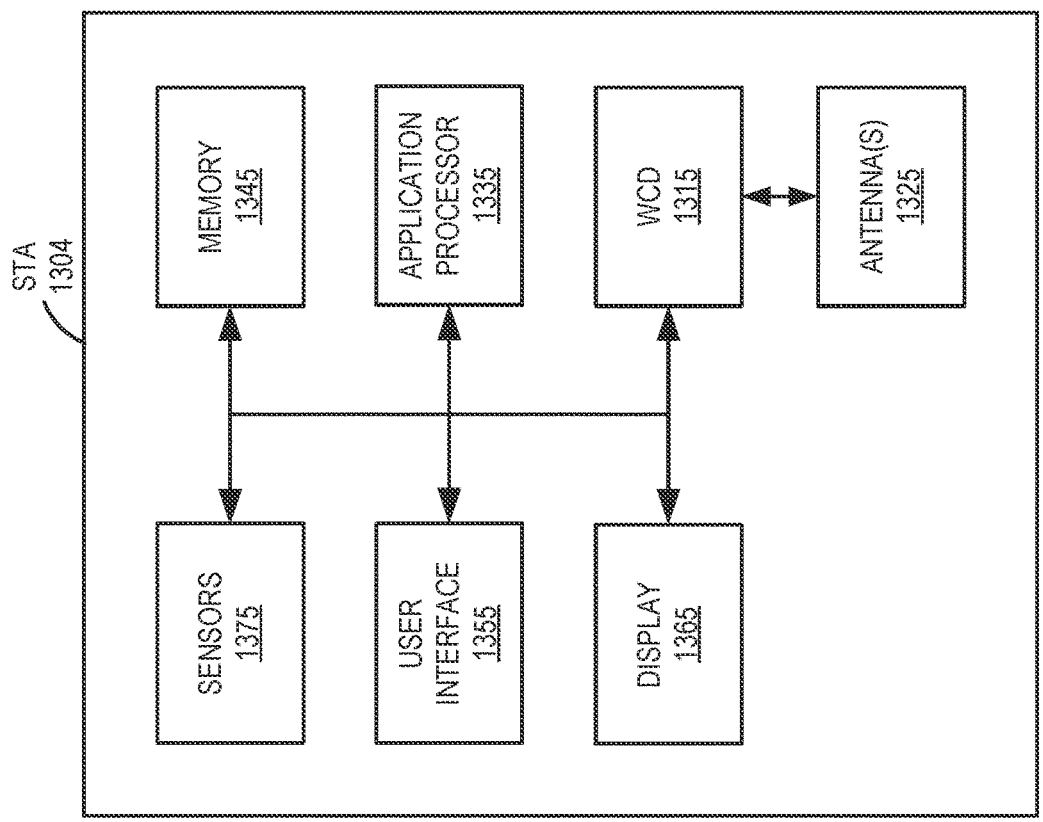
FIG. 13B shows a block diagram of an example station (STA).
Figure 13A:
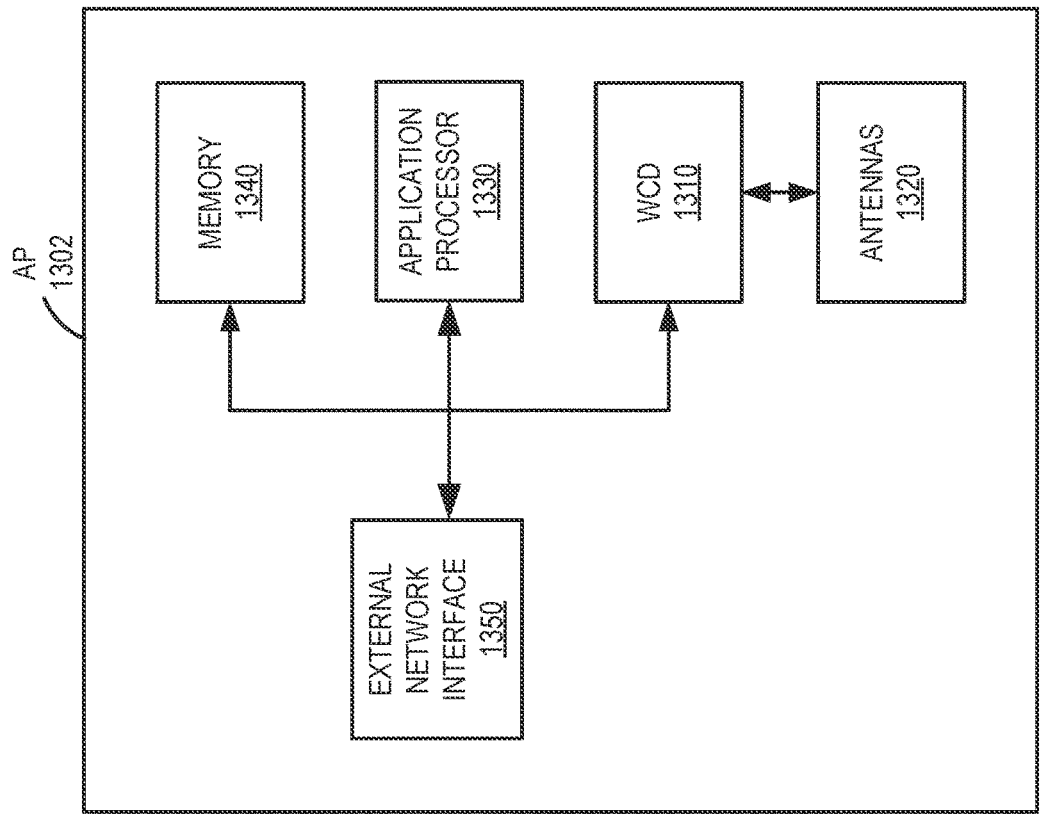
FIG. 13A shows a block diagram of an example access point (AP).

FIG. 13A shows a block diagram of an example AP 1302. For example, the AP 1302 can be an example implementation of the AP 102 described with reference to FIG. 1. The AP 1302 includes a wireless communication device (WCD) 1310 (although the AP 1302 may itself also be referred to generally as a wireless communication device as used herein). For example, the wireless communication device 1310 may be an example implementation of the wireless communication device 1200 described with reference to FIG. 12. The AP 1302 also includes multiple antennas 1320 coupled with the wireless communication device 1310 to transmit and receive wireless communications. In some implementations, the AP 1302 additionally includes an application processor 1330 coupled with the wireless communication device 1310, and a memory 1340 coupled with the application processor 1330. The AP 1302 further includes at least one external network interface 1350 that enables the AP 1302 to communicate with a core network or backhaul network to gain access to external networks including the Internet. For example, the external network interface 1350 may include one or both of a wired (for example, Ethernet) network interface and a wireless network interface (such as a WWAN interface). Ones of the aforementioned components can communicate with other ones of the components directly or indirectly, over at least one bus. The AP 1302 further includes a housing that encompasses the wireless communication device 1310, the application processor 1330, the memory 1340, and at least portions of the antennas 1320 and external network interface 1350.

FIG. 13B shows a block diagram of an example STA 1304. For example, the STA 1304 can be an example implementation of the STA 104 described with reference to FIG. 1. The STA 1304 includes a wireless communication device 1315 (although the STA 1304 may itself also be referred to generally as a wireless communication device as used herein). For example, the wireless communication device 1315 may be an example implementation of the wireless communication device 1200 described with reference to FIG. 12. The STA 1304 also includes one or more antennas 1325 coupled with the wireless communication device 1315 to transmit and receive wireless communications. The STA 1304 additionally includes an application processor 1335 coupled with the wireless communication device 1315, and a memory 1345 coupled with the application processor 1335. In some implementations, the STA 1304 further includes a user interface (UI) 1355 (such as a touchscreen or keypad) and a display 1365, which may be integrated with the UI 1355 to form a touchscreen display. In some implementations, the STA 1304 may further include one or more sensors 1375 such as, for example, one or more inertial sensors, accelerometers, temperature sensors, pressure sensors, or altitude sensors. Ones of the aforementioned components can communicate with other ones of the components directly or indirectly, over at least one bus. The STA 1304 further includes a housing that encompasses the wireless communication device 1315, the application processor 1335, the memory 1345, and at least portions of the antennas 1325, UI 1355, and display 1365.

FIGS. 1-13B and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of numerous examples, any combination of aspects from any of the examples is also within the scope of the disclosure. The examples in this disclosure are provided for pedagogical purposes. Alternatively, or in addition to the other examples described herein, examples include any combination of the following implementation options.

An innovative aspect of the subject matter described in this disclosure can be implemented as a method performed by a first WLAN device. The method may include outputting, for transmission from a first WLAN device to a second WLAN device via a wireless channel, a first packet that includes a plurality of portions modulated using a corresponding plurality of modulation and coding scheme MCS options. A first portion may be modulated using a first MCS and a second portion may be modulated using a second MCS. The method may include receiving, from the second WLAN device, feedback information in response to the first packet. The feedback information may be usable by the first WLAN device to determine a selected MCS to modulate a subsequent packet for transmission to the second WLAN device via the wireless channel.

In some implementations, the first packet is an MCS testing packet.

In some implementations, the first packet has a format based on an NDP defined for the WLAN.

In some implementations, the first packet includes at least one indicator requesting the feedback information.

In some implementations, the first packet includes upper layer data for the second WLAN.

In some implementations, the first portion and the second portion are appended as a padding section before or after the upper layer data in the first packet.

In some implementations, the first packet includes an indictor to cause the second WLAN device to receive the first portion of the first packet using the first MCS and the second portion of the first packet using the second MCS.

In some implementations, the first portion is modulated in a first set of tones of an OFDM symbol and the second portion is modulated in second set of tones of the same OFDM symbol.

In some implementations, the plurality of portions is modulated using the corresponding plurality of MCS options in the same OFDM symbol.

In some implementations, the first portion and the second portion of the first packet are modulated in different orthogonal frequency division multiplexed OFDM symbols.

In some implementations, the first packet includes a series of OFDM symbols, each OFDM symbol being modulated using a different MCS.

In some implementations, the feedback information includes a field that indicates the selected MCS that was selected by the second WLAN device.

In some implementations, the feedback information includes one or more quality metrics related to the first and second portions. The method may include determining, by the first WLAN device, the selected MCS based on the one or more quality metrics.

In some implementations, the one or more quality metrics may include a log-likelihood ratio (LLR), a signal to noise ratio (SNR), a signal to interference plus noise ratio (SINR), an error vector magnitude (EVM), or any combination thereof.

In some implementations, receiving the feedback information includes receiving an acknowledgement (ACK) message in response to the first packet. The ACK message may include a field populated with the feedback information.

In some implementations, receiving the feedback information includes receiving a clear to send (CTS) message in response to the first packet. The CTS message may include a field populated with the feedback information.

In some implementations, the first packet is a request to send (RTS) packet.

Another innovative aspect of the subject matter described in this disclosure can be implemented as a method performed by a second WLAN device. The method may include receiving, from a first WLAN device via a wireless channel, a first packet that includes a plurality of portions modulated using a corresponding plurality of MCS options. A first portion may be modulated using a first MCS and a second portion may be modulated using a second MCS. The method may include outputting, for transmission to the first WLAN device, feedback information in response to the first packet. The feedback information may be usable by the first WLAN device to determine a selected MCS to modulate a subsequent packet for transmission from the first WLAN device via the wireless channel.

In some implementations, the method may include determining one or more first quality metrics based on the first portion of the first packet. The method may include determining one or more second quality metrics based on the second portion of the first packet.

In some implementations, the method may include determining the feedback information based on the one or more first quality metrics and the one or more second quality metrics. The feedback information may include a plurality of quality metrics that correspond to the plurality of portions of the first packet.

In some implementations, the method may include determining the selected MCS based on the one or more first quality metrics and the one or more second quality metrics. The feedback information may include a field that indicates the selected MCS.

Another innovative aspect of the subject matter described in this disclosure can be implemented as a system. The system may include a first WLAN device configured to transmit, from the first WLAN device to a second WLAN device via a wireless channel, a first packet that includes a plurality of portions modulated using a corresponding plurality of MCS options. The plurality of portions may include at least a first portion is modulated using a first MCS and a second portion is modulated using a second MCS. The system may include the second WLAN device configured to receive the first packet. The second WLAN device may be configured to determine one or more first quality metrics based on the first portion of the first packet. The second WLAN device may be configured to determine one or more second quality metrics based on the second portion of the first packet. The second WLAN device may be configured to determine a selected MCS for the first WLAN device to use for modulating a subsequent packet to the second WLAN device via the wireless channel. The selected MCS may be based on the one or more first quality metrics and the one or more second quality metrics. The second WLAN device may be configured to transmit a feedback message to the first WLAN device, the feedback message including a field populated with the selected MCS. The system may include the first WLAN device configured to receive the feedback message and transmit the subsequent packet using the selected MCS.

Another innovative aspect of the subject matter described in this disclosure can be implemented as an apparatus. The apparatus may include a modem and at least one processor communicatively coupled with the at least one modem. The processor, in conjunction with the modem, may be configured to perform any one of the above-mentioned methods or features described herein.

Another innovative aspect of the subject matter described in this disclosure can be implemented as a computer-readable medium having stored therein instructions which, when executed by a processor, causes the processor to perform any one of the above-mentioned methods or features described herein.

Another innovative aspect of the subject matter described in this disclosure can be implemented as a system having means for implementing any one of the above-mentioned methods or features described herein.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication in a wireless local area network (WLAN), comprising:
    transmitting a first packet from a first WLAN device to a second WLAN device via a wireless channel, wherein the first packet includes a plurality of link adaptation test portions generated using a corresponding plurality of transmission rate options, each of the plurality of link adaptation test portions being modulated using a different modulation and coding scheme (MCS) option;
    receiving, from the second WLAN device, feedback information based on the plurality of link adaptation test portions in the first packet, wherein the feedback information includes a log-likelihood ratio (LLR) metric indicative of a decoding success rate for each of the plurality of link adaptation test portions and a field that indicates a transmission rate option, of the corresponding plurality of transmission rate options, to use for a subsequent transmission to the second WLAN device; and
    transmitting a subsequent packet to the second WLAN device via the wireless channel using the transmission rate option indicated by the feedback information, wherein the transmission rate option includes an MCS option associated with a link adaptation test portion having a highest throughput and a corresponding LLR metric that is above a threshold.

2. The method of claim 1, wherein:
    the corresponding plurality of transmission rate options includes different MCS options; and
    the plurality of link adaptation test portions includes a first portion modulated using a first MCS and a second portion modulated using a second MCS option.

3. The method of claim 1, wherein the first packet has a format based on a null data packet (NDP) defined for the WLAN.

4. The method of claim 1, wherein the first packet includes an indication to cause the second WLAN device to receive the plurality of link adaptation test portions using the corresponding plurality of transmission rate options and provide the feedback information based on the plurality of link adaptation test portions.

5. The method of claim 1, wherein the first packet is a dedicated link adaptation test packet having a format specified by a link adaptation protocol.

6. The method of claim 1, wherein the first packet includes upper layer data for the second WLAN device in addition to the plurality of link adaptation test portions.

7. The method of claim 6, wherein the upper layer data is included in a separate portion of the first packet that is different from the plurality of link adaptation test portions.

8. The method of claim 1, wherein the plurality of link adaptation test portions includes a first portion that is modulated in a first set of tones of an orthogonal frequency division multiplexed (OFDM) symbol and a second portion that is modulated in a second set of tones of the OFDM symbol.

9. The method of claim 1, wherein the plurality of link adaptation test portions includes a first portion and a second portion of the first packet are modulated in different orthogonal frequency division multiplexed (OFDM) symbols associated with transmission of the first packet.

10. The method of claim 9, wherein the first packet includes a series of OFDM symbols, each OFDM symbol being modulated using a different transmission rate option.

11. The method of claim 1, wherein the transmission rate option indicated by the feedback information is selected by the second WLAN device.

12. The method of claim 1, wherein the feedback information includes one or more link quality metrics related to the plurality of link adaptation test portions, and the transmission rate option is selected based, at least in part, on the one or more link quality metrics.

13. The method of claim 12, wherein the one or more link quality metrics include at least one member selected from a group consisting of:
    a signal to noise ratio (SNR),
    a signal to interference plus noise ratio (SINR), and
    an error vector magnitude (EVM).

14. The method of claim 1, wherein receiving the feedback information includes receiving an acknowledgement (ACK) message in response to the first packet, wherein the ACK message includes a field populated with the feedback information.

15. The method of claim 1, wherein the first packet is a request to send (RTS) packet and wherein receiving the feedback information includes receiving a clear to send (CTS) message in response to the RTS packet, wherein the CTS message includes a field populated with the feedback information.

16. A method for wireless communication in a wireless local area network (WLAN), comprising:
    receiving, at a second WLAN device from a first WLAN device via a wireless channel, a first packet that includes a plurality of link adaptation test portions generated using a corresponding plurality of transmission rate options, each of the plurality of link adaptation test portions being modulated using a different modulation and coding scheme (MCS) option;

transmitting feedback information to the first WLAN device based on the plurality of link adaptation test portions in the first packet, the feedback information including a log-likelihood ratio (LLR) metric indicative of a decoding success rate for each of the plurality of link adaptation test portions and a field that indicates a transmission rate option, of the corresponding plurality of transmission rate options, to use for a subsequent transmission to the second WLAN device; and receiving, from the first WLAN device via the wireless channel, a subsequent packet transmitted using the transmission rate option indicated by the feedback information, wherein the transmission rate option includes an MCS option associated with a link adaptation test portion having a highest throughput and a corresponding LLR metric that is above a threshold.

17. The method of claim 16,
wherein the plurality of link adaptation test portions includes a first portion modulated using a first MCS and a second portion modulated using a second MCS option.

18. The method of claim 17, further comprising:
determining one or more first link quality metrics based on the first portion of the first packet; and
determining one or more second link quality metrics based on the second portion of the first packet.

19. The method of claim 18, wherein the feedback information includes the one or more first link quality metrics and the one or more second link quality metrics.

20. The method of claim 16, further comprising:
selecting the transmission rate option based on the plurality of link adaptation test portions in the first packet.

21. An apparatus of a first wireless local area network (WLAN) device, comprising:
at least one processor communicatively coupled with at least one modem and configured to:
output a first packet for transmission from the first WLAN device to a second WLAN device via a wireless channel, wherein the first packet includes a plurality of link adaptation test portions generated using a corresponding plurality of transmission rate options, each of the plurality of link adaptation test portions being modulated using a different modulation and coding scheme (MCS) option;
obtain, from the second WLAN device, feedback information based on the plurality of link adaptation test portions in the first packet, wherein the feedback information includes a log-likelihood ratio (LLR) metric indicative of a decoding success rate for each of the plurality of link adaptation test portions and a field that indicates a transmission rate option, of the corresponding plurality of transmission rate options, to use for a subsequent transmission to the second WLAN device; and
transmit a subsequent packet to the second WLAN device via the wireless channel using the transmission rate option indicated by the feedback information, wherein the transmission rate option includes an MCS option associated with a link adaptation test portion having a highest throughput and a corresponding LLR metric that is above a threshold.

22. The apparatus of claim 21,
wherein the plurality of link adaptation test portions includes a first portion modulated using a first MCS and a second portion modulated using a second MCS option.

23. The apparatus of claim 21, wherein the first packet includes an indication to cause the second WLAN device to receive the plurality of link adaptation test portions using the corresponding plurality of transmission rate options and provide the feedback information based on the plurality of link adaptation test portions.

24. The apparatus of claim 21, wherein the first packet is a dedicated link adaptation test packet having a format specified by a link adaptation protocol.

25. The apparatus of claim 21, wherein the first packet includes upper layer data for the second WLAN device in addition to the plurality of link adaptation test portions.

26. The apparatus of claim 21, further comprising:
at least one transceiver coupled to the at least one modem;
a plurality of antennas coupled to the at least one transceiver to wirelessly transmit signals output from the at least one transceiver; and
a housing that encompasses the at least one modem, the at least one processor, the at least one transceiver and at least a portion of the plurality of antennas.

27. An apparatus of a second wireless local area network (WLAN) device, comprising:
at least one processor communicatively coupled with at least one modem and configured to:
obtain, from a first WLAN device via a wireless channel, a first packet that includes a plurality of link adaptation test portions generated using a corresponding plurality of transmission rate options, each of the plurality of link adaptation test portions being modulated using a different modulation and coding scheme (MCS) option;
output feedback information for transmission to the first WLAN device based on the plurality of link adaptation test portions in the first packet, the feedback information including a log-likelihood ratio (LLR) metric indicative of a decoding success rate for each of the plurality of link adaptation test portions and a field that indicates a transmission rate option, of the corresponding plurality of transmission rate options, to use for a subsequent transmission to the second WLAN device; and
obtain, from the first WLAN device via the wireless channel, a subsequent packet transmitted using the transmission rate option indicated by the feedback information, wherein the transmission rate option includes an MCS option associated with a link adaptation test portion having a highest throughput and a corresponding LLR metric that is above a threshold.

28. The apparatus of claim 27, wherein the plurality of link adaptation test portions includes a first portion modulated using a first MCS and a second portion modulated using a second MCS option.

29. The apparatus of claim 27, further comprising:
at least one transceiver coupled to the at least one modem;
a plurality of antennas coupled to the at least one transceiver to wirelessly transmit signals output from the at least one transceiver; and
a housing that encompasses the at least one modem, the at least one processor, the at least one transceiver and at least a portion of the plurality of antennas.

* * * * *